United States Patent
Bennett

(10) Patent No.: US 11,055,651 B2
(45) Date of Patent: Jul. 6, 2021

(54) SYSTEMS AND METHODS FOR VISUALIZATION OF FLOW DIRECTION IN A DISTRIBUTION NETWORK

(71) Applicant: SCHNEIDER ELECTRIC USA, INC., Andover, MA (US)

(72) Inventor: John Bennett, Garrett Park, MD (US)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 4 days.

(21) Appl. No.: 16/219,318

(22) Filed: Dec. 13, 2018

(65) Prior Publication Data
US 2020/0193339 A1   Jun. 18, 2020

(51) Int. Cl.
| | |
|---|---|
| *G06Q 10/06* | (2012.01) |
| *G06F 16/29* | (2019.01) |
| *G06Q 50/06* | (2012.01) |
| *G06Q 10/08* | (2012.01) |
| *G06Q 30/02* | (2012.01) |

(52) U.S. Cl.
CPC ......... *G06Q 10/0633* (2013.01); *G06F 16/29* (2019.01); *G06Q 10/087* (2013.01); *G06Q 30/0201* (2013.01); *G06Q 50/06* (2013.01)

(58) Field of Classification Search
CPC ...... G06F 30/18; G06F 16/29; G06F 2119/06; G06F 16/2358; G06Q 30/0201; G06Q 50/06; H04L 41/22; G05F 1/66
See application file for complete search history.

(56) References Cited

U.S. PATENT DOCUMENTS 5,276,789 A * 1/1994 Besaw .................... G06F 30/18
                                                       345/440
5,568,399 A * 10/1996 Sumic .................. G01R 31/086
                                                       700/293
6,643,669 B1   11/2003 Novak et al.
7,054,799 B1    5/2006 Hartell et al.
7,499,046 B1 *  3/2009 Wright .................. G06F 16/444
                                                       345/418

(Continued)

OTHER PUBLICATIONS

Vega, Ramiro, Managing Water Utilities with Geographic Information Systems: The Case of the City of Tampa, Florida Northwest Missouri State University, Sep. 2009 (Year: 2009).*
Al-Sakkaf, Abdulrahman, Applications of GIS in Electrical Power System May 2013 (Year: 2013).*
Nga, Dao Viet et al., Visualization Techniques in Smart Grid Smart Grid and Renewable Energy, vol. 3, 2012 (Year: 2012).*

(Continued)

*Primary Examiner* — Scott L Jarrett
(74) *Attorney, Agent, or Firm* — Lando & Anastasi, LLP

(57) ABSTRACT

A method for visualizing flow direction in a distribution network includes receiving, on a hardware device, Geographic Information System (GIS) data corresponding to the distribution network from a GIS database. The distribution network includes equipment to facilitate distribution of a commodity over a distribution area, and the GIS data includes information relating to distribution of the commodity. Commodity vectorized measurement data indicative of at least a flow direction of the commodity over the distribution area is generated based, at least in part, on a comparison of a current measurement value of the commodity to a reference measurement value of the commodity. The commodity vectorized measurement data is dynamically displayed on a geographic map display including imagery representative of the distribution network contained in the GIS data.

21 Claims, 20 Drawing Sheets

(56) References Cited

U.S. PATENT DOCUMENTS

| | | | |
|---|---|---|---|
| 7,647,136 B2 | 1/2010 | McDowell | |
| 7,920,983 B1* | 4/2011 | Peleg | G01M 3/2807 |
| | | | 702/100 |
| 8,639,483 B1* | 1/2014 | Walski | E03B 1/02 |
| | | | 703/9 |
| 8,862,998 B2* | 10/2014 | Arquie | G06F 3/0484 |
| | | | 715/736 |
| 8,892,221 B2* | 11/2014 | Kram | G06Q 50/06 |
| | | | 700/51 |
| 9,158,035 B2* | 10/2015 | Dam | G01W 1/10 |
| 9,973,406 B2* | 5/2018 | Gorman | H04L 41/22 |
| 10,120,401 B2* | 11/2018 | Song | G05B 15/02 |
| 10,580,095 B2* | 3/2020 | Markey | G06Q 50/06 |
| 10,892,838 B2* | 1/2021 | Cruickshank, III | H04H 20/12 |
| 2003/0033117 A1 | 2/2003 | Sage | |
| 2003/0216949 A1* | 11/2003 | Kram | G06Q 50/00 |
| | | | 705/5 |
| 2004/0236620 A1 | 11/2004 | Chauhan et al. | |
| 2004/0246256 A1* | 12/2004 | Parakkuth | G06F 16/957 |
| | | | 345/501 |
| 2005/0071139 A1* | 3/2005 | Patwardhan | G06F 30/20 |
| | | | 703/9 |
| 2005/0240381 A1* | 10/2005 | Seiler | G06F 30/20 |
| | | | 703/1 |
| 2005/0268245 A1* | 12/2005 | Gipps | G06F 30/18 |
| | | | 715/762 |
| 2005/0273300 A1* | 12/2005 | Patwardhan | G06F 30/20 |
| | | | 703/9 |
| 2007/0061274 A1* | 3/2007 | Gipps | G06Q 10/06 |
| | | | 705/400 |
| 2007/0168923 A1 | 7/2007 | Connor et al. | |
| 2008/0077368 A1 | 3/2008 | Nasle | |
| 2008/0091742 A1 | 4/2008 | Marshall | |
| 2008/0300834 A1 | 12/2008 | Wiemer et al. | |
| 2010/0191774 A1 | 7/2010 | Mason, Jr. et al. | |
| 2011/0107227 A1* | 5/2011 | Rempell | G06F 8/34 |
| | | | 715/738 |
| 2012/0022713 A1* | 1/2012 | Deaver, Sr. | G05B 17/02 |
| | | | 700/298 |
| 2012/0038661 A1* | 2/2012 | Rissanen | G05B 23/0267 |
| | | | 345/592 |
| 2012/0066578 A1 | 3/2012 | Robin et al. | |
| 2013/0179140 A1 | 7/2013 | Sharma | |
| 2013/0211797 A1 | 8/2013 | Scolnicov et al. | |
| 2013/0268196 A1* | 10/2013 | Dam | G06Q 10/04 |
| | | | 702/3 |
| 2014/0039849 A1* | 2/2014 | Preis | G06F 30/20 |
| | | | 703/1 |
| 2015/0012148 A1* | 1/2015 | Bhageria, Jr. | G06Q 50/06 |
| | | | 700/295 |
| 2015/0180538 A1 | 6/2015 | Smith et al. | |
| 2016/0259357 A1* | 9/2016 | Wepman | G05F 1/66 |
| 2017/0193029 A1* | 7/2017 | Bennett | G06F 16/2379 |
| 2017/0195187 A1 | 7/2017 | Bennett et al. | |
| 2017/0195188 A1* | 7/2017 | Bennett | G06F 30/18 |
| 2017/0206292 A1 | 7/2017 | Bennett et al. | |

OTHER PUBLICATIONS

Sutton, T. et al., A Gentle Introduction to GIS Chief Directorate: Spatial Planning & information, Department of Land Affairs, Easter Cape South Africa (Year: 2009).*

QGIS User's Guide Release 2.8 Jul. 30, 2016 (Year: 2016).*

Crosier, Scott et al., ArcGIS 9—Getting Started With ArcGIS ESRI, Inc., 2005 (Year: 2005).*

Chutkay, Sumathi, Integrated GIS for Gas Distribution System Geospatial World, Sep. 1, 2009 (Year: 2009).*

Quesada, P. et al., Distribution Network Model Builder for OpenDSS in Open Source GIS Software 2016 IEEE PES Transmission & Distribution Conference and Exposition—Latin America, 2016 (Year: 2016).*

Qadir, Junaid et al., Using Geographic Information Systems to Develop a Robust Electricity Utility Network International Journal of Advanced Remote Sensing and GIS, vol. 6, No. 1, 2017 (Year: 2017).*

Damilola, Dare-Alao, Geospatial modeling of electricity distribution network Geospatial World, Apr. 22, 2013 (Year: 2013).*

Flow direction in a geometric network ESRI, ArcGIS, Feb. 14, 2016, Retrieved from Archive.org Apr. 30, 2020 (Year: 2016).*

Ash, Jeff, et al. "Optimizing complex networks for resilience against cascading failure," Physica a: statistical mechanics and its applications 380 (2007): 673-683, (Year: 2007).

Collins-Sussman et al., "Version Control with Subversion, for Subversion 1.7", 2011 (Year: 2011).

Dharchoudhury, Abhijit et al. "Design and analysis of power distribution networks in PowerPC™ microprocessors," Proceedings 1998 Design and Automation Conference, 35th DAC, (Cat. No. 98CH36175), IEEE, 1998, (Year: 1998).

Hijazi et al., "IFC to CityGML transformation framework for geo-analysis: a water utility network case," 4th International Workshop on 3D Geo-Information, Nov. 4-5, 2009, Ghent, Belgium, 2009. (Year: 2009).

Lee, Jiyeong, "3D data model for representing topological relations of urban features," Proceedings of the 21st annual ESRI international user conference, San Diego, CA, USA, 2001. (Year: 2001).

Lee, Jiyeong, "A spatial access-oriented implementation of a 3-D GIS topological data model for urban entities," GeoInformatica 8.3 (2004): 237-264. (Year: 2004).

Sharma, Mithun J. et al. "Analytic hierarchy process to assess and optimize distribution network," Applied Mathematics and Computation 202.1 (2008): 256-265, (Year: 2008).

Sherali, Hanif D. et al. "A global optimization approach to a water distribution network design problem," Journal of Global Optimization 11.2 (1997): 107-132, (Year: 1997).

Shimizu, Yoshiaki, and Hiroshi Kawamoto, "An implementation of parallel computing for hierarchical logistic network design optimization using PSO," Computer Aided Chemical Engineering, vol. 25, Elsevier, 2008. 605-610.

U.S. Appl. No. 15/398,611, filed Jan. 4, 2017, John Bennett et al.
U.S. Appl. No. 15/398,654, filed Jan. 4, 2017, John Bennett et al.
U.S. Appl. No. 15/398,670, filed Jan. 4, 2017, John Bennett et al.
U.S. Appl. No. 15/410,515, filed Jan. 19, 2017, John Bennett et al.

* cited by examiner

SYSTEMS AND METHODS FOR VISUALIZATION OF FLOW DIRECTION IN A DISTRIBUTION NETWORK

FIELD

This disclosure relates generally to utility distribution networks, and more particularly, to systems and methods for visualization of flow direction in a utility distribution network.

BACKGROUND

As is known, utility companies provide services such as electricity, gas, water, telecommunication, cable television, etc., to customers. These services typically require a distribution network for the distribution area being serviced by the utility companies. The distribution network may include, for example, pipelines, cables, and/or other equipment to facilitate distribution of a utility to customers. An electrical distribution network, for example, may include cables/overhead lines and sub-stations to facilitate distribution of electricity from a transmission/subtransmission network to customers.

SUMMARY

Described herein are systems and methods related to visualization of flow direction in a distribution network (e.g., an electrical, gas or water distribution network). More particularly, in one aspect, a method for visualizing flow direction in a distribution network includes receiving, on a hardware device, Geographic Information System (GIS) data corresponding to the distribution network from a GIS database. The distribution network includes equipment to facilitate distribution of a commodity over a distribution area, and the GIS data includes information relating to distribution of the commodity. Commodity vectorized measurement data indicative of at least a flow direction of the commodity over the distribution area is generated based, at least in part, on a comparison of a current measurement value of the commodity to a reference measurement value of the commodity. The commodity vectorized measurement data is dynamically displayed on a geographic map display including imagery representative of the distribution network contained in the GIS data. In embodiments, the imagery representative of the distribution network includes a geographic map illustrating a layout (e.g., a physical layout) of the distribution network. Additionally, in embodiments the GIS data represents facilities and/or other actual assets or equipment in the field (i.e., the distribution network). The hardware device on which the GIS data is received may include, be included in, or correspond to a distribution network management system.

As is known, flow direction information can be of life or death importance, for example, when developing emergency switching or valve operation orders to be executed in the distribution network. As is also known, flow direction information is critically important when designing distribution network facilities or analyzing their performance. As will be appreciated from further from discussions below, the systems and methods disclosed herein make it easier to see flow direction information in a distribution network, and thereby easier to identify actionable events (e.g., an emergency event, or failure) in the distribution network and take appropriate actions in response thereto (e.g., developing emergency switching or valve operation orders). As will also be appreciated from further discussions below, the systems and methods disclosed herein also enable the providing of flow direction information for designing distribution network facilities or analyzing their performance, for example. Other example advantages associated with the systems and methods disclosed herein will be understood.

The above and below described systems and methods for visualization of flow direction in a distribution network may include one or more of the following features either individually or in combination with other features in some embodiments. Generating commodity vectorized measurement data may include receiving, at the hardware device, sensor data from one or more sensors in the distribution network. In embodiments, the sensors are configured to measure one or more parameters associated with distribution of the commodity and in response thereto generate the sensor data. The sensors may include at least one supervisory control and data acquisition (SCADA) sensor, for example. In embodiments, the sensors are coupled to or disposed within the equipment to facilitate distribution of the commodity. Generating commodity vectorized measurement data may also include determining a current measurement value of the commodity based on the sensor data in some embodiments. Generating commodity vectorized measurement data may further include generating commodity vectorized measurement data indicative of at least a flow direction of the commodity over the distribution area based, at least in part, on a comparison of the current measurement value of the commodity to a reference measurement value of the commodity contained in the GIS data. In embodiments, the reference measurement value corresponds to a measurement value of the commodity at a first time. Additionally, in embodiments the current measurement value corresponds to a measurement value of the commodity at a second time after the first time.

Generating commodity vectorized measurement data may include receiving, at the hardware device, sensor data from one or more sensors in the distribution network at a first time. In embodiments, the sensors are configured to measure one or more parameters associated with distribution of the commodity and in response thereto generate the sensor data. Generating commodity vectorized measurement data may also include determining a first measurement value of the commodity based on the sensor data received at the first time, and receiving, at the hardware device, sensor data from the one or more sensors at a second time after the first time. A second measurement value of the commodity may be determined based on the sensor data received at the second time, and commodity vectorized measurement data indicative of at least a flow direction of the commodity over the distribution area may be generated based, at least in part, on a comparison of the second measurement value to the first measurement value. In embodiments, the second measurement value corresponds to a current measurement value. Additionally, in embodiments the first measurement value corresponds to a reference measurement value. In some embodiments, the sensor data is received (or otherwise retrieved) from a database, and corresponds to sensor data that was previously received from one or more sensors in the distribution network (i.e., historical sensor data). In other embodiments, the sensor data is received from the database, and corresponds to simulated sensor data. The simulated sensor data may, for example, represent sensor data received from actual sensors in the distribution network. In embodiments, the parameters associated with distribution of the commodity include a state of the equipment used to distribute the commodity. For example, the parameters may include the open/closed state (i.e., a discrete state) of a switch or a valve, as opposed to a quantitative measure of flow-related values like electrical voltage or current, or gas/water pressure or flow rate in some embodiments.

In embodiments, dynamically displaying the commodity vectorized measurement data includes identifying portions of the distribution network that are of interest, and dynamically displaying the vectorized measurement data on the geographic map display for the identified portions of interest. Additionally, in embodiments dynamically displaying the commodity vectorized measurement data includes dynamically displaying the commodity vectorized measurement data on the geographic map display for select portions of the distribution network, for example, to distinguish the select portions of the distribution network from other portions of the distribution network. In embodiments, the select portions of the distribution network are user selected portions of the distribution network corresponding to portions of the distribution network that are of interest to the user.

In embodiments, the commodity vectorized data dynamically displayed on a geographic map display is represented by an animation on the geographic map display. The animation may include animated line graphics, for example, an arrow in motion. In embodiments, the animated line graphics have an associated direction of motion, and the direction of motion (e.g., of the arrow in motion) is related to the flow direction of the commodity. Additionally, in embodiments the animated line graphics have an associated rate of motion, and the rate of motion (e.g., of the arrow in motion) is related to a measured flow rate of the commodity, a measured pressure level of the commodity, or a measured energy level of the commodity. The measured flow rate of the commodity may be determined, for example, based, at least in part, on the comparison of the current measurement value of the commodity to the reference measurement value of the commodity. The reference measurement value may correspond to a measurement value of the commodity at a first time. Additionally, the current measurement value may correspond to a measurement value of the commodity at a second time after the first time.

In embodiments, at least one characteristic associated with the animation is based on any one of: the flow direction of the commodity, a measured flow rate of the commodity, a measured pressure level of the commodity, or a measured energy level of the commodity. The at least one characteristic may include, for example, one or more of a type of the animation, a speed of the animation, a color of the animation, and a thickness of one or more features (e.g., lines) of the animation. In embodiments, the at least one characteristic corresponds to a feature (e.g., a line segment) of the animation, and the method further includes adjusting a position of the feature on the geographic map based on any one of: the flow direction of the commodity, the measured flow rate of the commodity, the measured pressure level of the commodity, or the measured energy level of the commodity. In embodiments, the animation is a user configured animation. Additionally, in embodiments the animation includes an icon indicative of a type of the commodity (e.g., an electrical, water, gas or telecom based commodity). As illustrated above, the commodity vectorized measurement data (here, as represented by the animation) represents "real world" features (e.g., flow direction) of the commodity.

In accordance with further aspects of this disclosure, dynamically displaying the commodity vectorized measurement data includes identifying a platform (e.g., a software platform) of a client device on which the geographic map is to be displayed, generating the geographic map and the animation using a graphics library associated with the identified platform, and presenting the geographic map and the animation on a display of the client device. In embodiments, the client device includes a computer or mobile device. In embodiments in which the geographic map is to be displayed on a plurality of client devices, dynamically displaying the commodity vectorized measurement data may include identifying platforms of each of the plurality of client devices on which the geographic map is to be displayed, generating the geographic map and the animation using a graphics library associated with the identified platforms for each of the plurality of client devices, and presenting the geographic map and the animation on respective displays of the client devices.

The method may further include analyzing performance of the distribution network based, at least in part, on the commodity vectorized measurement data, and providing an indication of the distribution network performance on the geographic map display. Additionally, the method may further include analyzing (or otherwise processing) the commodity vectorized measurement data to identify actionable events (e.g., an emergency event, or failure) in the distribution network, and automatically performing an action affecting at least one component of the distribution network in response to the identified actionable events. In embodiments, the action affecting at least one component of the distribution network is automatically performed by a control system associated with the distribution network. The action may include, for example, controlling (e.g., a state of) one or more switches or valves in the distribution network. In embodiments, the at least one component of the distribution network includes the equipment to facilitate distribution of the commodity. The distribution network may include, for example, any one of: an electrical distribution network, a gas distribution network, a water distribution network, or a telecom distribution network. Additionally, the commodity may include, for example, any one of: electric power, gas, water, or telecom data. Further, the equipment may include at least one of a power line, a pipeline, and a cable.

In another aspect of this disclosure, a system for managing a distribution network (i.e., a distribution network management system) includes a memory, and a processor coupled to the memory, the processor and the memory configured to: receive GIS data corresponding to the distribution network from a GIS database. The distribution network includes equipment to facilitate distribution of a commodity over a distribution area, and the GIS data includes information relating to distribution of the commodity. The processor and the memory are also configured to generate commodity vectorized measurement data indicative of at least a flow direction of the commodity over the distribution area based, at least in part, on a comparison of a current measurement value of the commodity to a reference measurement value of the commodity. The commodity vectorized measurement data is dynamically displayed on a geographic map display including imagery representative of the distribution network contained in the GIS data. In embodiments, the commodity vectorized data is represented by an animation on the geographic map display. The processor and the memory may also be configured to process the commodity vectorized measurement data to identify actionable events in the distribution network, and automatically perform an action affecting at least one component of the distribution network in response to the identified actionable events. In some embodiments, the distribution network management system is provided in a distribution network management system (e.g., advanced distribution management system (ADMS)).

In embodiments, the distribution network management system may include, or be implemented to provide, one or more of the features of the above-described method for visualization of flow direction in a distribution network. For example, in some embodiments the animation presented on the geographic map display may include animated line graphics, for example, an arrow in motion. In embodiments, the animated line graphics have an associated direction of motion, and the direction of motion (e.g., of the arrow in motion) is related to the flow direction of the commodity. Additionally, in embodiments the animated line graphics have an associated rate of motion, and the rate of motion (e.g., of the arrow in motion) is related to a measured flow rate of the commodity, a measured pressure level of the commodity, or a measured energy level of the commodity. The measured flow rate of the commodity may be determined, for example, based, at least in part, on the comparison of the current measurement value of the commodity to the reference measurement value of the commodity. The reference measurement value may correspond to a measurement value of the commodity at a first time. Additionally, the current measurement value may correspond to a measurement value of the commodity at a second time after the first time.

In a further aspect of this disclosure, a method for visualizing flow direction in a distribution network includes receiving, on a hardware device, GIS data corresponding to the distribution network from a GIS database. The distribution network includes equipment to facilitate distribution of a commodity over a distribution area, and the GIS data includes information relating to distribution of the commodity. CVM data indicative of at least a flow direction of the commodity over the distribution area may be generated based, at least in part, on the GIS data. The CVM data is dynamically displayed on a geographic map display including imagery representative of the distribution network contained in the GIS data. In some embodiments, the CVM is generated based, at least in part, on inferences from network topology of the distribution network and attributes of the equipment to facilitate distribution of the commodity. The network topology and the equipment attributes may be contained in the GIS data, for example. In one embodiment, the equipment includes one or more pipes, and the equipment attributes include a diameter of the pipe. It is understood that many other types of equipment and equipment attributes exist and may be used in generating the CVM data.

As is known, map displays of distribution systems traditionally use stationary arrow symbols to indicate direction of flow of a commodity. This convention typically requires a fair amount of user concentration upon the visual task of interpreting the arrow symbols when making decisions that depend upon the direction of flow. The systems and methods disclosed herein, in contrast, cause the flow direction information to leap to the eye with very little focus or concentration required on the part of the user. The effect is especially useful as an aid to distinguishing some parts of a network from others by applying the animation effect to parts of interest. For example, it becomes very easy to distinguish the radial sections of an electric distribution feeder circuit from the mesh sections by using the systems and methods disclosed herein for the radial parts and traditional, non-animated line graphics for the mesh parts. Additional aspects and features of the systems and methods disclosed herein (which provide for a so-called "marching ants" effect) will be appreciated from discussions below.

BRIEF DESCRIPTION OF THE DRAWINGS

The foregoing features of the disclosure, as well as the disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Figure 1:
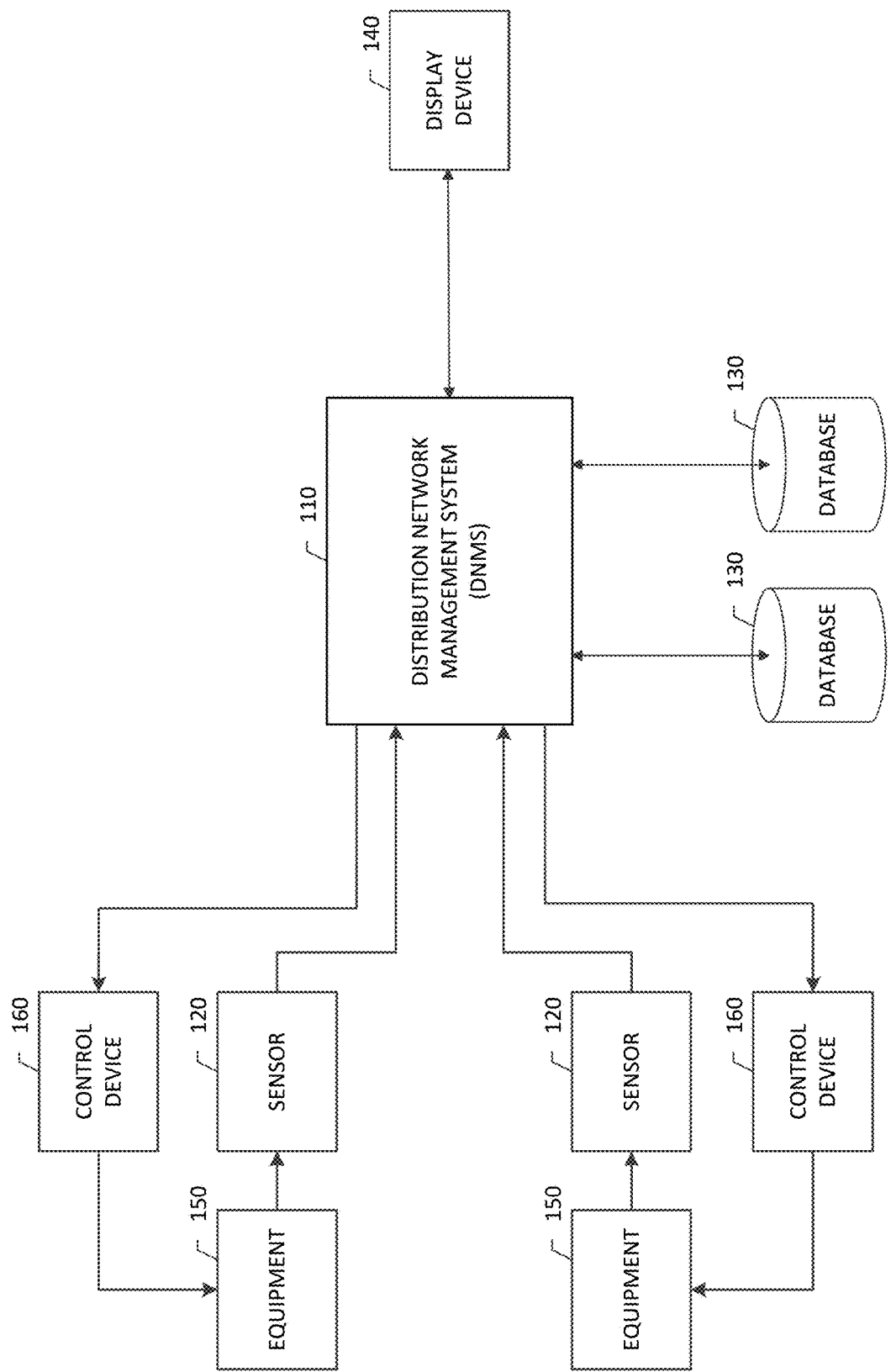
FIG. 1 shows an example system for monitoring a distribution network in accordance with embodiments of the disclosure.
Figure 1A:
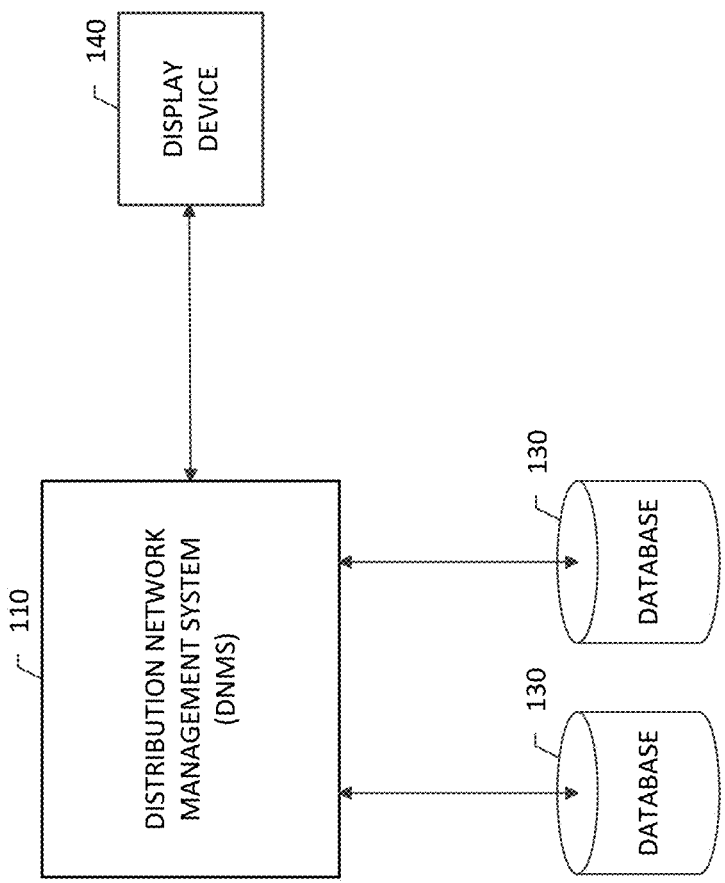
FIG. 1A shows another example system for monitoring a distribution network in accordance with embodiments of the disclosure.

Referring to FIGS. 1 and 1A, example systems for monitoring a distribution network (also sometimes referred to herein as "distribution network monitoring systems") in accordance with various embodiments of the disclosure are shown.

Referring first to FIG. 1, an example distribution network monitoring system is shown including a distribution network management system (DNMS) 110. The DNMS 110 is communicatively coupled to at least one sensor (here, two sensors 120), at least one database (here, two databases 130), and at least one display device (here, one display device 140) in the example embodiment shown. In embodiments, the DNMS 110 is communicatively coupled to the sensors 120, the databases 130 and the display device 140 through a communications network, such as, a local area network, a wide area network, a combination thereof, or the like. Additionally, in embodiments the DNMS 110 is communicatively coupled to the sensors 120, the databases 130 and the display device 140 through a wired or wireless link, for example.

In the example embodiment shown, the sensors 120 are each coupled to respective equipment 150 in the distribution network monitored by the distribution network monitoring system. The distribution network may include, for example, any one of an electrical distribution network, a gas distribution network, a water distribution network, or a telecom distribution network. Additionally, the equipment 150 in the distribution network may include poles, power lines, conductors, transformers, switching and protective equipment, generators, pipelines, cables, and/or other equipment to facilitate distribution of a commodity over the distribution network, for example, depending on the commodity or commodities being distributed over the distribution network. The commodity or commodities may include, for example, at least one of electric power, gas, water, and telecom data. The sensors 120 may include mass or fluid sensors, power or energy meters, or substantially any other types (and number) of sensors as may be suitable for use in the system, for example, depending on the commodity or commodities being distributed over the system. In embodiments, the sensors 120 include at least one supervisory control and data acquisition (SCADA) sensor.

In embodiments, the sensors 120 may sample, sense or monitor one or more parameters (e.g., energy usage parameters) associated with the equipment 150 to which they are coupled. Additionally, in embodiments the sensors 120 may sample, sense or monitor one or more parameters (e.g., energy level or flow rate) associated with the commodity or commodities distributed using the equipment 150 including, for example, a state of the equipment 150 used to distribute the commodity or commodities. The sensors 120 may be embedded within the equipment 150 in some embodiments. According to various aspects, one or more of the sensors 120 may be configured to monitor utility feeds, surge protectors, trip units and transformers, which are some examples of equipment 150, and outputs of the sensors 120 may be used to detect ground faults, voltage sags, voltage swells, momentary interruptions and oscillatory transients, as well as temperature, and harmonic distortions, which are some example parameters associated with the equipment 150. The sensors 120 may also monitor devices, such as generators, including outputs, protective relays, battery chargers, and sensors (for example, water and fuel sensors). According to another aspect, the sensors 120 can detect generator conditions including reverse power, temperature, overvoltage and undervoltage conditions, as well as other parameters such as temperature, including ambient temperature. A wide variety of other monitoring functions can be performed by the sensors 120, and the aspects and embodiments disclosed herein are not limited to the sensors 120 operating according to the above-mentioned examples.

The databases 130 to which the DNMS 110 is coupled includes at least one Geographic Information System (GIS) database. The at least one GIS database stores objects defined in a geometric space. In embodiments, the objects include objects representing the distribution equipment 150 (e.g., poles, conductors, transformers, switching and protective equipment, etc.) and other aspects and features of the distribution network(s) monitored by the distribution network monitoring system. Some entities and attributes in the GIS database can be used to make direct inferences about the direction and/or rate of the flow of the commodity in the network. For example, an electric substation circuit breaker may be considered the point at which electric power enters a distribution feeder circuit, while a distribution transformer or a customer service meter may be considered a point at which power exits the network. The rated power attribute of a substation transformer can be considered a proxy metric for the amount of power flowing into a set of distribution feeder circuits, while the rated power attribute of a distribution transformer can be considered a proxy metric for the amount of power flowing out of the primary feeder circuit and into the secondary circuit served by the transformer.

One example of a GIS database is a geodatabase. Typically, each utility company (e.g., gas, electric, water, etc.) maintains its own GIS database. For example, a gas company can have its own GIS database that stores GIS data for its gas distribution network. Similarly, an electric company can have its own GIS database that stores GIS data for its electric distribution network. The GIS database may support query execution on stored data as well as manipulation of the stored data, for example. Examples of data stored on the GIS database may include, but are not limited to: geometry or shape data and attributes of objects (e.g., objects representing the distribution equipment 150), typically grouped into different feature classes. The GIS database may be implemented in Microsoft SQL Server, PostgreSQL relational database management systems, Microsoft Access, Oracle, IBM DB2, IBM Informix, and/or the like. One example GIS database is described in co-pending U.S. patent application Ser. No. 15/398,654 entitled "System and Method for Validating Network Configuration Changes in a Client Environment," which is assigned to the assignee of the present disclosure and incorporated herein by reference in its entirety.

In some embodiments, the databases 130 to which the DNMS 110 is coupled also includes a database for storing sensor data. For example, the database for storing sensor data may be configured to store sensor data generated by sensors 120. Additionally, the database for storing sensor data may be configured to store simulated sensor data. The simulated sensor data may, for example, represent sensor data received from actual sensors (i.e., sensors 120) in the distribution network.

The DNMS 110 may include a computing device having a processor and a memory with computer code instructions stored thereon. The processor and the memory may be configured to provide a number of functions. For example, the processor and the memory may receive GIS data corresponding to a distribution network from a GIS database, and generate commodity vectorized measurement data indicative of at least a flow direction of a commodity over a respective distribution area of the distribution network. Additionally, the processor and the memory may dynamically display the commodity vectorized measurement data on a geographic map display including imagery representative of the distribution network. Further example functions of the processor and the memory are described throughout this disclosure.

In embodiments, the computing device of the DNMS 110 may be a local computing device, for example, proximate to the distribution network(s) monitored by the distribution network monitoring system, or a remote device, for example, remote to the monitored distribution network(s). In embodiments, the DNMS computing device may be a cloud computing system, or a cloud connected computing system. As used herein, the terms "cloud" and "cloud computing" are intended to refer to computing resources connected to the Internet via a communication network, which may be a wired or wireless network, or a combination of both. The computing resources comprising the cloud may be centralized in a single location, distributed throughout multiple locations, or a combination of both. A cloud computing system may divide computing tasks amongst multiple racks, blades, processors, cores, controllers, nodes or other computational units in accordance with a particular cloud system architecture or programming. Similarly, a cloud computing system may store instructions and computational information in a centralized memory or storage, or may distribute such information amongst multiple storage or memory components. The cloud system may store multiple copies of instructions and computational information in redundant storage units, such as a RAID array.

The DNMS 110 can be configured to implement a variety of analysis techniques to identify patterns in GIS data received from the databases 130 and sensor data received from the databases 130 and/or sensors 120. The various analysis techniques discussed herein further involve the execution of one or more software functions, algorithms, instructions, applications, and parameters, which are stored on one or more sources of memory associated with the DNMS 110.

In embodiments, the DNMS 110 is responsive to the GIS data and the sensor data to monitor select parameters or characteristics associated with the distribution network(s) being monitored by the distribution network monitoring system. For example, the DNMS 110 may process the GIS data and/or the sensor data to monitor at least a flow direction of a commodity distributed over the distribution network. Additionally, the DNMS 110 may provide for visualization of the flow direction of the commodity, for example, on the display device 140.

In some embodiments, the display device 140 corresponds to a display or screen of the DNMS 110. Additionally, in some embodiments the display device 140 corresponds to a display or screen of a client device that is communicatively coupled to the DNMS 110. The client device can be a computing device, for example, a desktop computer, a laptop computer, a handheld computer, a tablet computer, a smart phone, and/or the like. The client device can include or be coupled to one or more input/output devices, for example, to facilitate user interaction (e.g., to display a geographic map, to enable a user to make a selection of an area on the geographic map). As one example, the client device can include an interactive touch screen input interface that accepts gestures as input. As another example, the client device can be coupled to a keyboard.

In embodiments, the DNMS 110 may also process the GIS data and the sensor data to identify actionable events (e.g., emergency events, or failures) in the distribution network, e.g., in response to analysis of the visualized flow direction of the commodity. In embodiments, the DNMS 110 may generate a control signal (or signals) in the response to the identified actionable event, with the control signal (or signals) being used to automatically performing an action affecting at least one component (e.g., equipment 150) of the distribution network. In the example embodiment shown, the DNMS 110 is coupled to at least one valve or other control device (here, two control devices 160) and the control devices 160 are each coupled to respective equipment 150 in the distribution network. In embodiments, the control devices 160 are responsive to control signals received from the DNMS 110 to control, for example, a flow (or a rate of flow) or energy level of the commodity in the distribution network.

Referring to FIG. 1A, in which like elements of FIG. 1 are shown having like reference designations, another example distribution network monitoring system is shown. As illustrated, unlike the distribution network monitoring system shown in FIG. 1, the distribution network monitoring system shown in FIG. 1A does not include sensors 120.

According to one aspect of this disclosure, information relating to flow of a commodity can be inferred from GIS data contained in a GIS database of one or more of the databases 130, without the need for sensors 120 to measure the commodity. As discussed above in connection with FIG. 1, some entities and attributes in the GIS database can be used to make direct inferences about the direction and/or rate of the flow of the commodity in the network. For example, a rough determination of relative flow rates of the commodity can be computed without aid of any direct measurements of flow, e.g., from the diameter attribute of a pipe, or from the nominal operating voltage of a conductor as inferred from attributes of the nearest connected transformer (i.e. "primary" versus "secondary" voltage). Sensor data may be captured in GIS data in the form of static attributes of equipment, such as pipe diameter, through processes better described as "inventory cataloging" than remote sensing, for example. It is understood that in some embodiments one or more features of the distribution network monitoring system shown in FIG. 1A may be combined with one or more features of the distribution network monitoring system shown in FIG. 1, and vice versa. For example, while the distribution network monitoring system illustrated in FIG. 1A is not shown as including the equipment 150 and the control devices 160 illustrated in the distribution network monitoring system shown in FIG. 1, in some embodiments the distribution network monitoring system shown in FIG. 1A may optionally include the equipment 150 and/or the control devices 160.

Additional aspects of systems and methods for visualizing flow direction in a distribution network in accordance with various embodiments of the disclosure are discussed further in connection with figures below.

Figure 2:
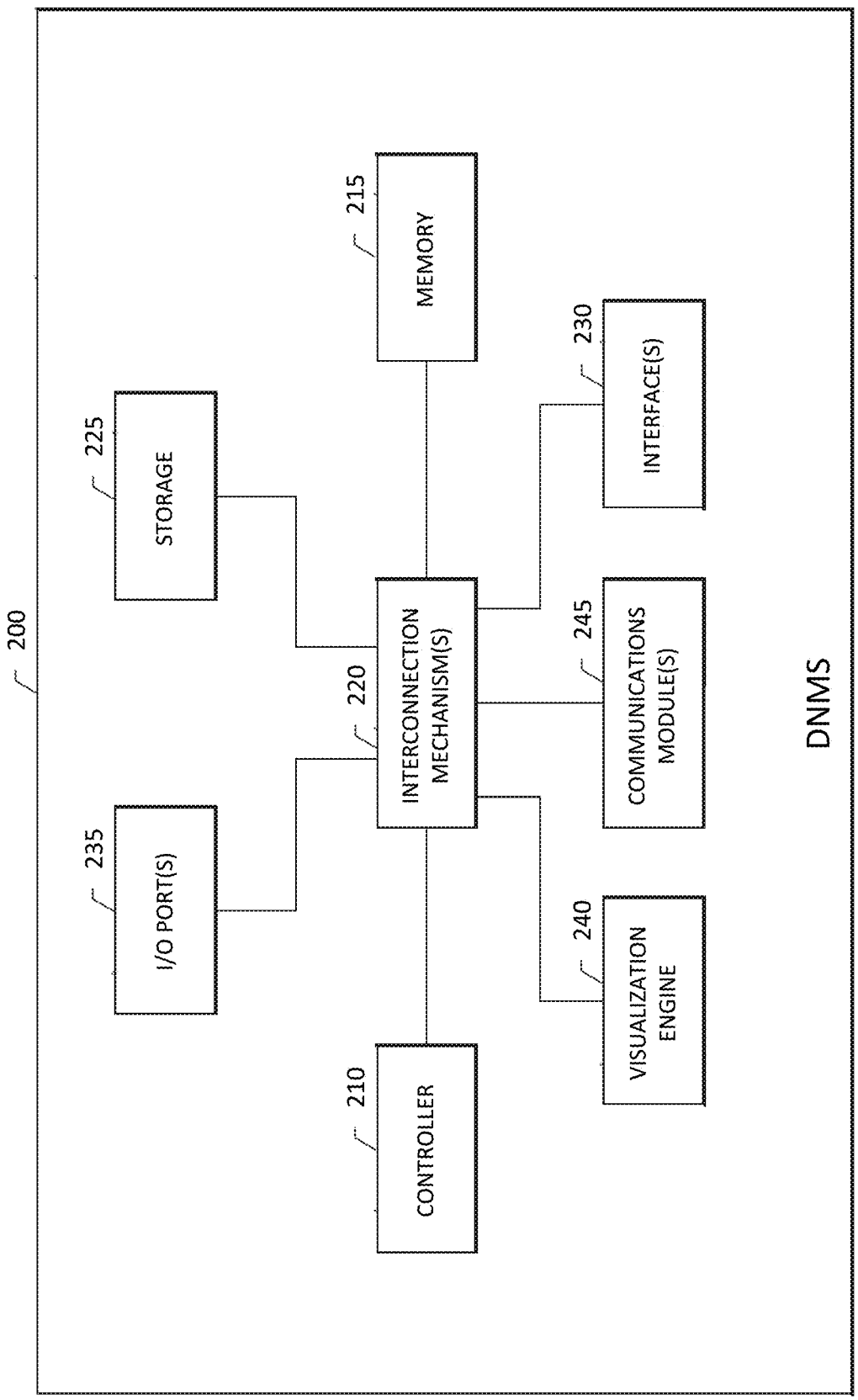
FIG. 2 shows an example distribution network management system that may be used in the systems of FIGS. 1 and 1A, for example, in accordance with embodiments of the disclosure.

Referring to FIG. 2, an example DNMS 200 that may be suitable for use in the distribution network management system shown in FIG. 1, for example, includes a controller 210, a memory device 215, storage 225, and an interface 230. The DNMS 200 also includes an input-output (I/O) port 235, a visualization engine 240, a communication module 245, and an interconnection mechanism 220 for communicatively coupling two or more DNMS components 210-245.

The memory device 215 may include volatile memory, such as DRAM or SRAM, for example. The memory device 215 may store programs and data collected during operation of the DNMS 200. For example, in embodiments in which the DNMS 200 is configured to monitor sensor data received from sensor devices (e.g., 120, shown in FIG. 1), for example, the memory device 215 may store the monitored sensor data.

The storage system 225 may include a computer readable and writeable nonvolatile recording medium, such as a disk or flash memory, in which signals are stored that define a program to be executed by the controller 210 or information to be processed by the program. The controller 210 may control transfer of data between the storage system 225 and the memory device 215 in accordance with known computing and data transfer mechanisms. In embodiments, sensor data (and other data) monitored or measured by the DNMS 200 may be stored in the storage system 225.

The I/O port 235 can be used to couple sensor devices (e.g., 120, shown in FIG. 1) and other devices, such as databases (e.g., 130, shown in FIG. 1), control devices (e.g., 160, shown in FIG. 1), display devices (e.g., 140, shown in FIG. 1) and user input devices (e.g., local or remote computing devices) (not shown), to the DNMS 200. The I/O port 235 may also be coupled to one or more user input/output mechanisms, such as buttons, displays, acoustic devices, etc., to provide alerts (e.g., to display a visual alert, such as text and/or a steady or flashing light, or to provide an audio alert, such as a beep or prolonged sound) and/or to allow user interaction with the DNMS 200.

The communication module 245 may be configured to couple the DNMS 200 to one or more external communication networks or devices. These networks may be private networks within a building in which the DNMS 200 is located, for example, or public networks, such as the Internet. In embodiments, the communication module 245 may also be configured to couple the DNMS 200 to a cloud-connected hub, or to a cloud-connected central processing unit, associated with the distribution network(s) monitored by the DNMS 200, for example.

The DNMS controller 210 may include one or more processors that are configured to perform specified function(s) of the DNMS 200. The processor(s) can be a commercially available processor, such as the well-known Pentium™, Core™, or Atom™ class processors available from the Intel Corporation. Many other processors are available, including programmable logic controllers. The DNMS controller 210 can execute an operating system to define a computing platform on which application(s) associated with the DNMS 200 can run.

In embodiments, sensor data (and other data, such as GIS data) monitored or measured by the DNMS 200 may be received at an input of the controller 210 as DNMS input data, and the controller 210 may process the monitored sensor data (and other data) to generate DNMS output data or signals at an output thereof. In embodiments, the DNMS output data or signals may correspond to an output of the DNMS 200. The DNMS output data or signals may be provided at I/O port(s) 235, for example. In embodiments, the DNMS output data or signals may be received by a cloud-connected central processing unit, for example, for further processing, and/or by control devices to which the DNMS 200 is coupled (e.g., for controlling one or more parameters associated with the equipment, as will be discussed further below).

A cloud-based service providing the flow direction data and/or visualization could also be offered as an aid to partner utilities or outside contractors hired on an emergency basis to assist with outage management. As is known, utilities often hire contractors to design new or upgraded facilities. The contractors typically consume GIS information through cloud based geographic data and mapping services. In embodiments, these services can be augmented by a separate cloud based service that provides the flow direction data and/or the visualization of flow direction from the DNMS.

In one example, the DNMS 200 may include an interface 230 for displaying visualizations indicative of the DNMS output data or signals. The interface 230 may correspond to a graphical user interface (GUI) in embodiments, and the visualizations may indicate at least a flow direction of a commodity over a distribution area, as will be described further below. In embodiments, the visualization engine or component 225 controls the display of information or data (e.g., DNMS output data or signals) on interface 230 and/or other display means (e.g., display device 140, shown in FIG. 1).

Components of the DNMS 200 may be coupled together by the interconnection mechanism 220, which may include one or more busses, wiring, or other electrical connection apparatus. The interconnection mechanism 220 may enable communications (e.g., data, instructions, etc.) to be exchanged between system components of the DNMS 200.

It is understood that DNMS 200 is but one of many potential configurations of DNMSs in accordance with various aspects of the disclosure. For example, DNMSs in accordance with embodiments of the disclosure may include more (or fewer) components than DNMS 200. Additionally, in embodiments one or more components of DNMS 200 may be combined. For example, in embodiments memory device 215 and storage system 225 may be combined. In some embodiments, the visualization engine or component 225 may be combined with interface 230. Additionally, in some embodiments the visualization engine 225 may be embodied in an application which is stored on the memory device 215 and accessed by the controller 210.

Referring to FIGS. 3-7, several flowcharts (or flow diagrams) are shown to illustrate various methods of the disclosure. Rectangular elements (typified by element 305 in FIG. 3), as may be referred to herein as "processing blocks," may represent computer software and/or DNMS algorithm instructions or groups of instructions. Diamond shaped elements (typified by element 425 in FIG. 4), as may be referred to herein as "decision blocks," represent computer software and/or DNMS algorithm instructions, or groups of instructions, which affect the execution of the computer software and/or DNMS algorithm instructions represented by the processing blocks. The processing blocks and decision blocks can represent steps performed by functionally equivalent circuits such as a digital signal processor circuit or an application specific integrated circuit (ASIC).

The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously and vice versa. It will also be understood that various features from the flowcharts described below may be combined in some embodiments. Thus, unless otherwise stated, features from one of the flowcharts described below may be combined with features of other ones of the flowcharts described below, for example, to capture the various advantages and aspects of systems and methods associated with dynamic tolerance curves sought to be protected by this disclosure.

Figure 3:
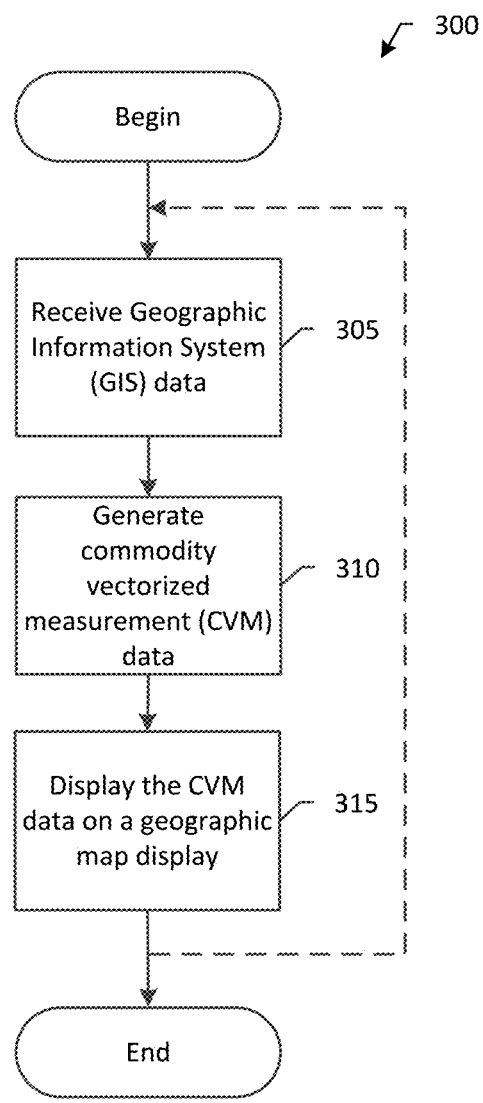
FIG. 3 shows an example method for visualizing flow direction in a distribution network in accordance with embodiments of the disclosure.

Referring to FIG. 3, a flowchart illustrates an example method 300 for visualizing flow direction in a distribution network that can be implemented, for example, on a processor of a DNMS (e.g., 200, shown in FIG. 1). Method 300 (or portions thereof) may also be implemented remote from the DNMS in a gateway, cloud, on-site software, etc.

As illustrated in FIG. 3, the method 300 begins at block 305, where GIS data corresponding to the distribution network is received on the DNMS from a GIS database (e.g., 130, shown in FIG. 1). In embodiments, the distribution network includes equipment (e.g., 150, shown in FIG. 1) to facilitate distribution of a commodity (or commodities) over a distribution area. Additionally, in embodiments the GIS data includes information relating to distribution of the commodity (or commodities). For example, the GIS data may include information relating to equipment used to facilitate distribution of the commodity (or commodities). The information may indicate, for example, types of equipment (e.g., pipes, cable lines, etc.), connections between the equipment (e.g., between one pipe and another pipe), and other characteristics associated with the equipment (e.g., length, diameter, material(s), etc.).

In embodiments, the GIS data is received at an input of the DNMS (e.g., 235, shown in FIG. 2) and stored (temporarily or permanently) on a memory device associated with the DNMS (e.g., 215, shown in FIG. 2). The GIS data may be received by a processor or controller (e.g., 210) of the DNMS, for example, upon request from the processor.

In embodiments, entities with attributes, along with network adjacency relationships between the entities (i.e., network topology), are received as GIS data at block 305. The attributes may include geographic coordinates and switch status (open or closed) for each piece of equipment (i.e., entity), e.g., conductors, switches, transformers, etc., in the distribution network. At block 305, the DNMS may also take in real-time switch status from sensors in the field (e.g., 120, shown in FIG. 1) and use that information, for example, to override the "normal" switch status attribute from the GIS data for every device whose real-time switch status differs from the normal status.

Each linear entity in the GIS data (e.g., each conductor) may possesses a Geometry attribute which is composed of an ordered sequence of geographic coordinate pairs (e.g., latitude and longitude in a spherical coordinate system, or alternatively, X and Y in a planar coordinate system projection), also known as Polyline object in GIS terminology. The first coordinate pair in the sequence may belongs to one or the other end of the linear entity, and the subsequent points describe a piece-wise linear shape formed by drawing a line segment between each adjacent coordinate pair in the sequence. The endpoint that is chosen to begin the sequence may be determined randomly, for example. Typically, it is an accident of the order in which the coordinates were originally entered into a data capturing system, e.g., a manual digitizing process such as sketching the lines with a series of mouse clicks on a digitizer. This initial orientation of the sequence is thus random, and for each line entity in the GIS database it will either be aligned with the direction of power flow in the line (which starts as one end of the line and flows toward the other), or it will be aligned in the opposite direction from the direction of power flow.

At block 310, commodity vectorized measurement (CVM) data indicative of at least a flow direction of the commodity over the distribution area is generated. In some embodiments, the CVM data is generated based, at least in part, on a comparison of a current measurement value of the commodity to a reference measurement value of the commodity. Additionally, in some embodiments the CVM data is generated based, at least in part, on the GIS data.

In embodiments in which the CVM data is generated based, at least in part, on a comparison of a current measurement value of the commodity to a reference measurement value of the commodity, the comparison may include, for example, comparing the current measurement value to the reference measurement value to identify differences (or changes) between the current measurement value and the reference measurement value. The CVM data may also be generated based on the GIS data, as noted above. For example, the CVM data may be generated based on information relating to distribution of the commodity contained in the GIS data and/or inferences that can be made from network topology and attribute data (e.g., equipment attribute data) contained in the GIS data. As one example, the CVM data may be generated based on known characteristics (e.g., pipe length, diameter, etc.) associated with equipment used to distribute the commodity. A commodity distributed using equipment having first characteristics may, for example, have different resulting CVM data than the commodity distributed using equipment having second characteristics different from the first characteristics.

An example method for generating CVM data is discussed below in connection with FIG. 4. However, let it suffice here to say that in some embodiments in which the CVM data is generated based, at least in part, on a comparison of a current measurement value of the commodity to a reference measurement value of the commodity, the current measurement value and the reference measurement value are determined from sensor data generated by sensor devices (e.g., 120, shown in FIG. 1) in the distribution network(s) managed by the DNMS. In other embodiments in which the CVM data is generated based, at least in part, on a comparison of a current measurement value of the commodity to a reference measurement value of the commodity, at least one of the current measurement value and the reference measurement value may correspond to theoretical or simulated sensor data indicative of actual sensor data generated by sensor devices (e.g., for designing a distribution network).

At block 315, the CVM data is dynamically displayed on a geographic map display including imagery representative of the distribution network. In embodiments, the imagery representative of the distribution network includes a geographic map illustrating a layout (e.g., a physical layout) of the distribution network, for example, as illustrated in FIGS. 9-9F and 10-10F, as will be described further below. The geographic map display may correspond to a GUI of the DNMS and/or another display means (e.g., display device 140, shown in FIG. 1), for example.

In some embodiments, the CVM data is represented by an animation (or another graphic) on the geographic map display, as will be described further in connection with figures below.

Subsequent to block 315, the method may end in some embodiments. In other embodiments, the method may return to block 305 and repeat again. In some embodiments in which the method ends after block 315, the method may be initiated again in response to user input and/or a control signal, for example.

In other embodiments, the method 300 may include one or more additional steps. For example, in one embodiment the method 300 may further include analyzing performance of the distribution network based, at least in part, on the CVM data, and providing an indication of the distribution network performance on the geographic map display.

In another embodiment, the method 300 may further include processing (or otherwise analyzing) the CVM data on the DNMS to identify actionable events in the distribution network, and automatically performing an action affecting at least one component of the distribution network in response to the identified actionable events. The actionable events may include an emergency event, or a failure, in the distribution network. For example, the emergency event may include a pipe leak (e.g., a water or gas pipe leak) or a malfunctioning transformer.

In embodiments, the action affecting at least one component of the distribution network is automatically performed by a control system associated with the distribution network. The action may include, for example, controlling (e.g., a state of) one or more control devices (e.g., 160, shown in FIG. 1), such as switches or valves, in the distribution network. In embodiments, the at least one component of the distribution network that is affected by the action may include the equipment to facilitate distribution of the commodity. As discussed above in connection with FIGS. 1 and 2, in some embodiments the DNMS may include or be coupled to a control system.

Figure 4:
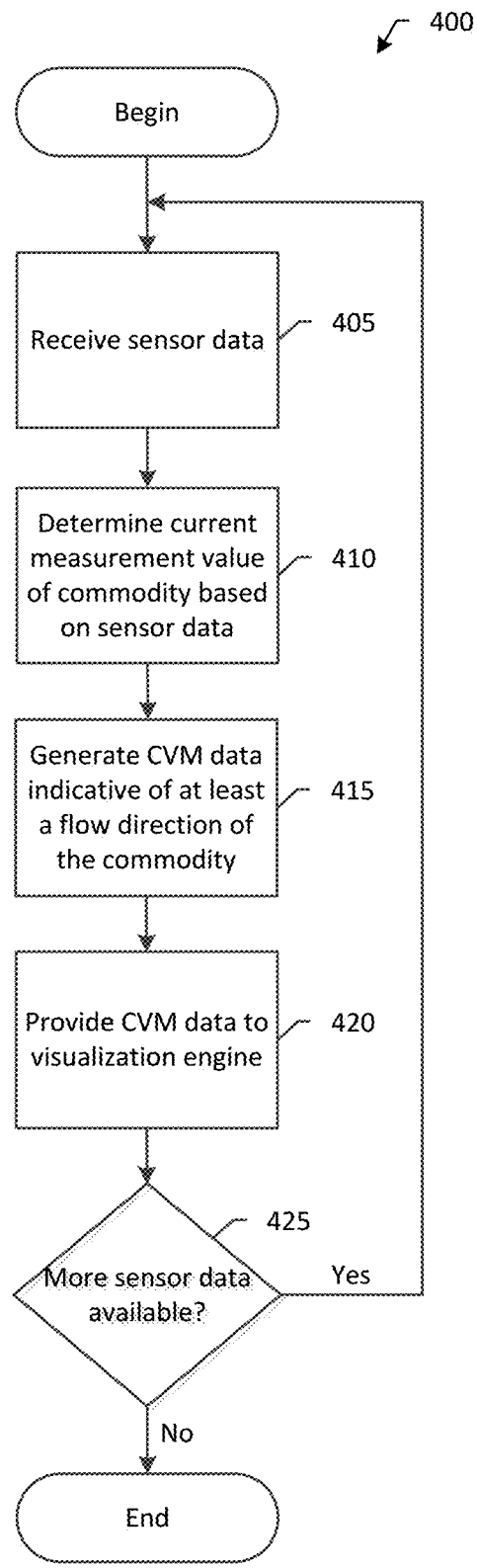
FIG. 4 shows an example method for generating commodity vectorized measurement data indicative of at least a flow direction of a commodity in accordance with embodiments of the disclosure.

Referring to FIG. 4, a flowchart illustrates an example method 400 for generating CVM data indicative of at least a flow direction of a commodity. The method 400 may be implemented, for example, on a processor of a DNMS (e.g., DNMS 110, shown in FIG. 1). In embodiments, the method 400 may correspond to example steps performed at block 310 of method 300 discussed above in connection with FIG. 3.

As illustrated in FIG. 4, the method 400 begins at block 405, where sensor data is received, for example, at an input (e.g., 235, shown in FIG. 2) of the DNMS. In some embodiments, the sensor data is received from one or more sensors (e.g., 120, shown in FIG. 2) in the distribution network(s) managed by the DNMS. The sensors may be configured to measure one or more parameters associated with distribution of the commodity, for example, over a particular distribution area of the distribution network. Additionally, the sensors may be responsive to the measured parameters to generate the sensor data. The parameters associated with distribution of the commodity may correspond to pressure, energy level, etc. depending on the commodity being distributed.

The sensor data can include measurements of voltage at any point in an electric network; current flowing through any branch (line segment) of an electric network; pressure at any point in a water or gas network; rate of flow through any branch of a water or gas network; direction of flow of current or gas or water through any branch of a network; metered rate of consumption at any customer point in an electric network (average and/or peak power for electric customers, volume over a given time interval for gas/water customers). The sensor data can also include "static" GIS data in some embodiments, as will be described further below.

At block 410, the DNMS determines a current measurement value of the commodity based on the sensor data received at block 405. Additionally, at block 415 the DNMS generates CVM data indicative of at least a flow direction of the commodity over the distribution area. In embodiments, the CVM data is generated based, at least in part, on a comparison of the current measurement value of the commodity to a reference measurement value of the commodity. Additionally, in embodiments the CVM data is generated based on GIS data (e.g., received at block 305, shown in FIG. 3).

In embodiments, the reference measurement value corresponds to a measurement value of the commodity at a first time, and the current measurement value corresponds to a measurement value of the commodity at a second (or next) time after the first time. For example, in embodiments sensor data may be received from one or more sensors in the distribution network at a first time, and the reference measurement value (or a first measurement value) may be determined based on the sensor data received at the first time. Additionally, in embodiments sensor data may be received from the sensors at a second time after the first time (e.g., at block 405), and the current measurement value (or a second measurement value) may be determined based on the sensor data received at the second time (e.g., at block 410).

In embodiments, a network model based on GIS database contents (i.e., GIS data) is also used to compute the direction of flow in every linear feature in the network, with respect to the direction of digitization of the line feature's geometry, where each line feature's geometry consists of an ordered sequence of (x, y) or (x, y, z) geographic coordinate tuples. In embodiments, the possible value of the computed direction attribute for each line segment are "forward," "reverse," "both," or "none." The "forward" and "reverse" values, for example, may indicate that the flow direction is in the same direction as, or in the opposite direction from, respectively, the ordered sequence of digitized coordinate tuples that define the line's geometry.

At block 420, the CVM data generated at block 415 is provided to a visualization engine (e.g., 240, shown in FIG. 2) of the DNMS. In embodiments, the visualization engine is responsive to the CVM data and to GIS data (e.g., received at block 305, shown in FIG. 3) to generate a visualization indicative of the CVM data and the GIS data. In embodiments, the visualization illustrates a current state of the distribution network(s) managed by the DNMS, as will be described further in connection with figures below. The visualization may be displayed on a geographic map display (e.g., at block 315, shown in FIG. 3).

In embodiments, spatial coordinate tuples for GIS line features may be transformed into screen coordinate tuples, and the tuples may be then re-ordered as needed for each line feature according to a computed flow direction attribute for that line feature (basically, we just reverse the original order of the tuples for any lines that have "reverse" flow direction). The ordered screen coordinates may then be used by the visualization engine to compose an animated dotted-line graphic element, for example, on the geographic map display.

At block 425, the DNMS determines if there is more sensor data available from the sensors (e.g., by polling the sensors). If it is determined that there is more sensor data available, the method 400 returns to block 405. Alternatively, if it is determined that there is no more sensor data available, the method 400 may end. In embodiments, the method may be initiated again in response to user input and/or a control signal, for example.

While the sensor data is described above as being received from one or more sensors in the distribution network(s) managed by the DNMS in the illustrated embodiment, it is contemplated that in some embodiments the sensor data may be received from a database, e.g., for designing or analyzing performance of the distribution network(s). In some embodiments, the sensor data received from the database (e.g., 130, shown in FIG. 1) may correspond to actual sensor data, e.g., from actual sensors in the distribution network managed by the DNMS. Additionally, in some embodiments the sensor data received from the database may correspond to theoretical or simulated sensor data indicative of actual sensor data. In some embodiments, the theoretical or simulated sensor data is contained in GIS data in the form of static attributes of equipment, such as pipe diameter.

In some embodiments, flow direction can be computed from the network topology alone, in absence of any quantitative measurements of the commodity that flows through the network. This is possible, for example, when the network has a purely radial topology. As used herein, "radial topology" means that for any given point on the network there is exactly one path, that does not intersect itself at any point, through which the commodity can flow to that point from exactly one other point which supplies the commodity into the network—in other words every consumer receives the commodity from one source only, and via one path only with no loops.

In this embodiment, the direction of flow in any branch is determined by the location of point sources in the network (i.e., the locations at which the commodity is considered to be injected into the network), in conjunction with the topology of the network (i.e., the ways in which the line segments are connected to each other to form an undirected graph, in the mathematical sense). The collection of point sources imposes upon the undirected graph model of the network a unique secondary directed graph with reciprocity=0 (i.e., no loops, in graph theoretical terms), in which the direction of each edge is aligned with the direction of flow of the commodity through the edge.

In this case there is still computational work to be done, since the GIS presents the distribution network as a simple undirected graph whose vertices carry attributes that allow the source vertices to be distinguished from the non-source vertices. The computation takes this undirected graph as its input and produces the one and only possible directed graph as its output.

In cases where non-radial topology is detected (computationally efficient methods can determine this), some further qualitative or quantitative measurements may be required to determine flow direction in every edge. The measurements may include either direct measurements of the direction and/or quantity of flow in some subset of the edges, (e.g. electrical current, or cubic feet per minute (CFM) of gas), or of some flow-related quantity at some subset of the vertices (e.g. voltage, or gas/water pressure), in order to determine the actual direction of flow in every edge in the network, for example.

In some embodiments, aspects of the concepts, systems, methods and techniques disclosed herein may be embodied in (or combined with) a software application (e.g., network design application) used for designing, editing, analyzing, and/or visualizing distribution networks that are represented in a GIS database (e.g., a geodatabase or GDB). One example analysis function that may be provided by the software application is "electric tracing." The electric tracing function may identify and display on a geographic map all of the features (i.e., objects with a geometric shape) that are electrically "upstream" or "downstream" of a given feature selected by a user as the starting point of the trace. One example software application that aspects of the concepts, systems, methods and techniques disclosed herein may be embodied in (or combined with) is described in co-pending U.S. patent application Ser. No. 15/398,654 entitled "System and Method for Validating Network Configuration Changes in a Client Environment," which is assigned to the assignee of the present disclosure and incorporated herein by reference in its entirety.

Figure 5:
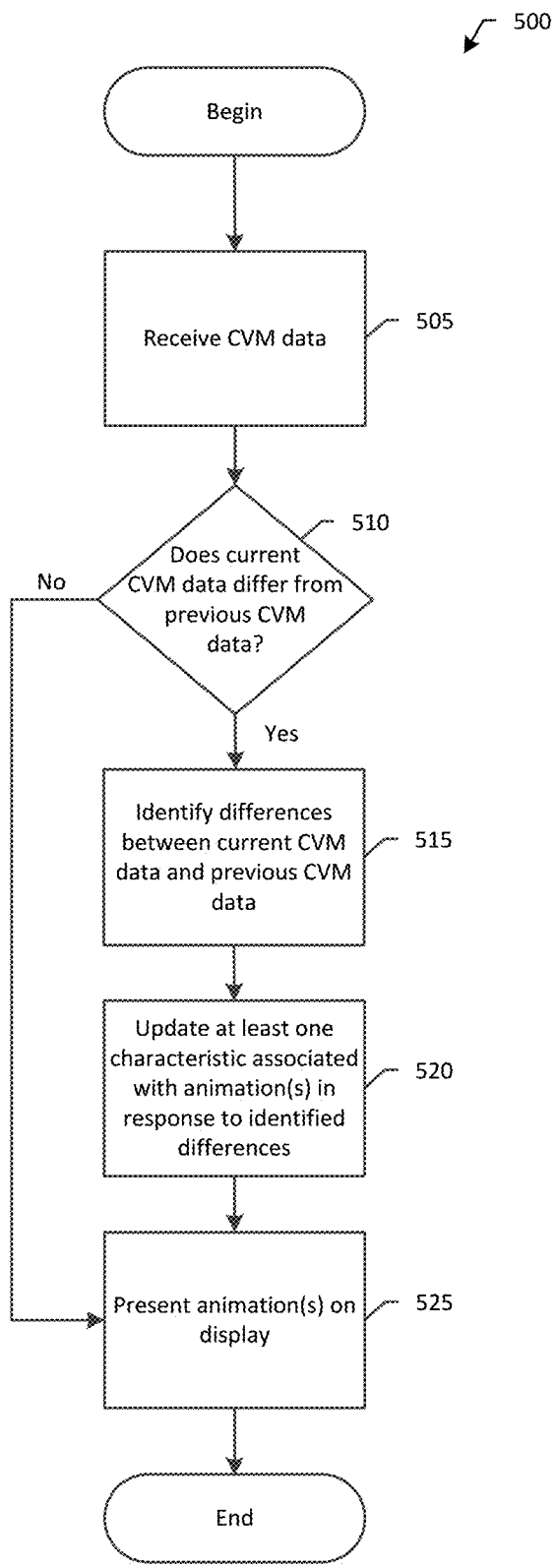
FIG. 5 shows an example method for dynamically displaying CVM data on a geographic map display in accordance with embodiments of the disclosure.

Referring to FIG. 5, a flowchart illustrates an example method 500 for dynamically displaying CVM data on a geographic map display. The method 500 may be implemented, for example, on a processor (and other portions) of a DNMS. In embodiments, the method 500 may correspond to example steps performed at block 315 of method 300 discussed above in connection with FIG. 3.

As illustrated in FIG. 5, the method 500 begins at block 505, where CVM data is received, for example, at an input of a visualization engine (e.g., 240, shown in FIG. 2) of the DNMS.

At block 510, the visualization engine determines if the CVM data received at block 505 (i.e., current CVM data) differs from previous CVM data. In embodiments, the current CVM data corresponds to CVM data generated or received at a first time, and the previous CVM data corresponds to CVM data generated or received at a second time prior to (e.g., immediately preceding, or a predetermined time before) the first time. In embodiments, the visualization engine determines if the current CVM data differs from previous CVM data by comparing the current CVM data to the previous CVM data.

If it is determined that the current CVM data differs from previous CVM data, the method may proceed to block 515. Alternatively, if it is determined that the current CVM data does not differ from the previous CVM data (i.e., the current CVM data is substantially the same as the previous CVM data), the method may proceed to block 525.

At block 515, the visualization engine identifies differences between the current CVM data and the previous CVM data. For example, the visualization engine may identify differences between one or more attributes of the current CVM data and like attributes of the CVM data. The attributes may, for example, be indicative of a flow direction or a flow rate, an energy level or an energy rate, or a pressure level or a pressure rate, of a commodity.

Figure 8:
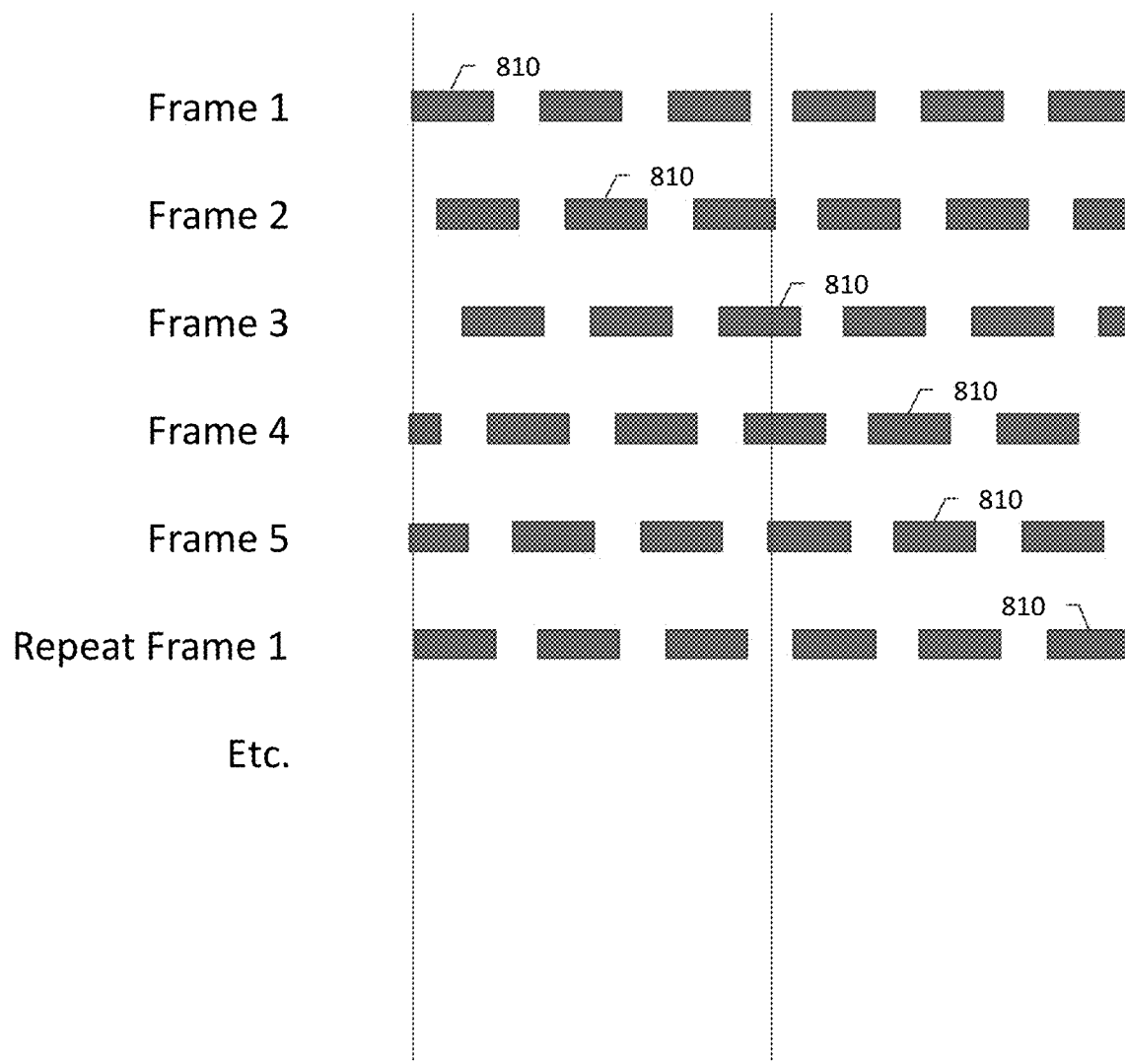
FIG. 8 shows an example sequence of animation frames indicative of the CVM data in accordance with embodiments of the disclosure.

At block 520, the visualization engine updates at least one characteristic (or feature) associated with animation(s) indicative of the CVM data in response to the identified differences. As discussed in connection with figures above, in some embodiments the CVM data is represented by animation(s), e.g., animated line graphics and/or an icon indicative of a type of the commodity. In embodiments, the at least one characteristic associated with the animation(s) that is updated or adjusted in response to the identified differences include one or more of a type of the animation(s), a speed of the animation(s), a color of the animation(s), and a thickness of one or more features of the animation(s), for example. In embodiments in which the speed or rate of motion of the animation(s) is related to the identified differences, for example, a position of at least one feature of the animation(s) (e.g., a line segment) may be adjusted from one frame of the animation to a next frame of the animation(s) based on the identified differences, as shown in FIG. 8, for example, as will be discussed further below.

In embodiments, the animation(s) may have an associated direction of motion, and the direction of motion may be related to a measured or calculated flow direction of the commodity. The direction of motion may be adjusted in response to the identified differences between the current CVM data and the previous CVM data (which may indicate a change in direction of the commodity).

At block 525, the visualization engine presents the animation(s) indicative on a geographic map display including imagery representative of the distribution network. In embodiments in which no (or insubstantial) differences are identified between current CVM data and previous CVM data at block 510, features associated with the animation(s) (e.g., line segments) may move from one frame of the animation to a next frame of the animation, etc., as shown in FIG. 8, for example, as will be discussed further below. However, according to some aspects of the disclosure, the at least one characteristic (or feature) associated with animation(s) that is responsive to identified differences between current CVM data and previous CVM data, will not change from one frame of the animation to a next frame of the animation, etc. in embodiments in which no (or insubstantial) differences are identified between current CVM data and previous CVM data.

After block 525, the method 500 may end. In embodiments, the method may be initiated again automatically (e.g., in response to the visualization engine receiving CVM data), or in response to user input or a control signal.

Figure 6:
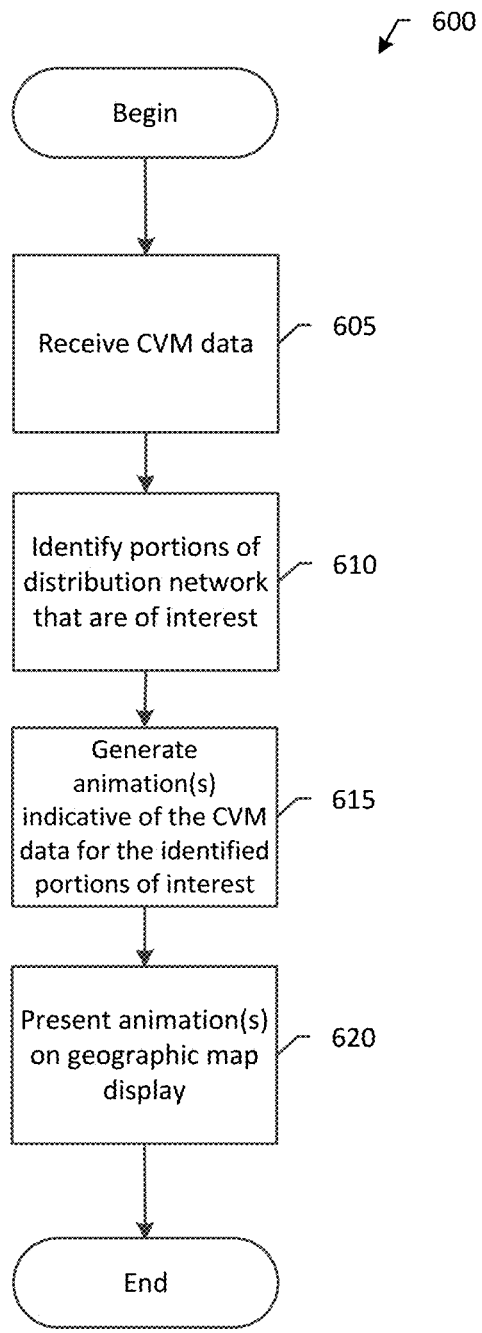
FIG. 6 shows another example method for dynamically displaying CVM data on a geographic map display in accordance with embodiments of the disclosure.

Referring to FIG. 6, a flowchart illustrates another example method 600 for dynamically displaying CVM data on a geographic map display. The method 600 may be implemented, for example, on a processor of a DNMS. Similar to method 500, in embodiments method 600 may correspond to example steps performed at block 315 of method 300 discussed above in connection with FIG. 3. Additionally, in embodiments method 600 may be implemented alone or in combination with method 500 discussed above, or method 700 discussed below in connection with FIG. 7.

As illustrated in FIG. 6, the method 600 begins at block 605, where CVM data is received, for example, at an input of a visualization engine (e.g., 240, shown in FIG. 2) of the DNMS.

At block 610, portions of the distribution network that are of interest are identified. In some embodiments, the portions are identified in response to user input. For example, a user may enter certain search criteria or terms (e.g., street names or particular areas associated with the distribution network) in an interface of a user device, and the DNMS processor or visualization engine may identify portions of interest in response to the search criteria. Additionally, in some embodiments the identified portions of interest correspond to user selected portions of the distribution network that are of interest to the user. For example, a user may select particular portions of the distribution network that are of interest to the user by clicking on select portions of the distribution network that is displayed on a geographical map presented to the user, e.g., on a display of a user device. Additionally, in embodiments the user may select the particular portions of the distribution network that are of interest to the user by drawing a region of interest on the select portions of the distribution network that is displayed on the geographical map.

At block 615, animation(s) indicative of the CVM data for the identified portions of interest are generated. Similar to methods described in figures above, the visualization engine of the DNMS may generate animation(s) having at least one characteristic (e.g., speed, color, thickness, etc.) that is based on the CVM data (e.g., current and previous CVM data).

At block 620, animation(s) generated at block 615 are displayed on a geographic map display for the identified portions of interest, for example, to distinguish the identified portions of interest from other portions of the distribution network. After block 620, the method 600 may end. In embodiments, the method may be initiated again automatically (e.g., in response to the visualization engine receiving CVM data), or in response to user input or a control signal.

Figure 7:
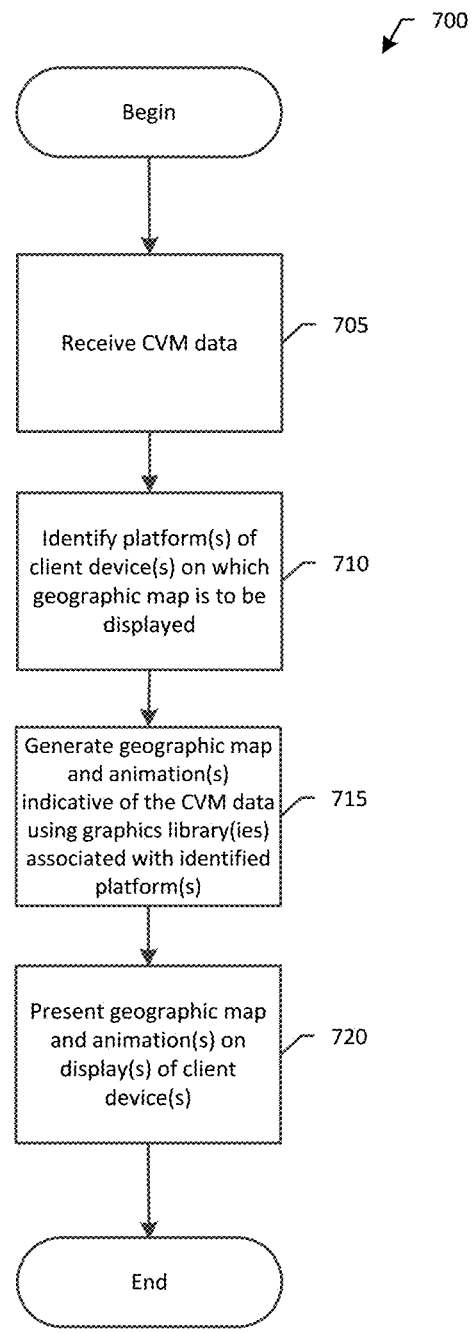
FIG. 7 shows a further example method for dynamically displaying CVM data on a geographic map display in accordance with embodiments of the disclosure.

Referring to FIG. 7, a flowchart illustrates a further example method 700 for dynamically displaying CVM data on a geographic map display. The method 700 may be implemented, for example, on a processor of a DNMS. Similar to methods 500 and 600, in embodiments method 700 may correspond to example steps performed at block 315 of method 300 discussed above in connection with FIG. 3. Additionally, in embodiments method 700 may be implemented alone or in combination with methods 500 and/or 600 discussed above.

As illustrated in FIG. 7, the method 700 begins at block 705, where CVM data is received, for example, at an input of a visualization engine (e.g., 240, shown in FIG. 2) of the DNMS.

At block 710, platform(s) (e.g. computer or software platforms) of client device(s) on which a geographic map including the CVM data is to be displayed are identified. The client device(s) may correspond to devices that are communicatively coupled to the DNMS. It is understood that the client device(s) may take a variety of forms, e.g., personal computer, laptop computer, tablet computer, smart phone, etc., and may operate using a variety of platforms (e.g., Windows®, Mac®, worldwide wide (or web), iOs® and Android®.

At block 715, the geographic map and an animation (or animations) indicative of the CVM data are generated using a graphics library (or libraries) associated with the identified platform(s). For example, the geographic map and the animation(s) may be generated using Windows Presentation Foundation (WPF) for Windows platform-based applications, D3 JavaScript Library for web-based applications, and Xamarin cross-platform development libraries for iOS and Android platform-based applications. It is understood that that other graphics libraries and other platform types may be used with the systems and methods disclosed herein.

At block 720, the geographic map and the animation(s) are presented on respective displays of the client device(s). In embodiments, the signals or data indicative of the geographic map and the animation(s) are provided by the DNMS visualization engine to the client device(s) for presentation on the client device displays. In embodiments, the graphics Application Programming Interface (API) that is used to achieve the animation effect is specific to the display technology being used by the client device(s). For example, a map display in an internet browser will employ browser-specific APIs to render the animated and non-animated line elements, while a desktop application in a Microsoft Windows environment might use WPF APIs to perform the rendering.

After block 720, the method 700 may end. In embodiments, the method may be initiated again automatically (e.g., in response to the visualization engine receiving CVM data), or in response to user input or a control signal.

Referring to FIG. 8, frames of an example animation indicative of CVM data are shown. As illustrated, the animation includes animated line graphics. As also illustrated, the animated line graphics include a plurality of line segments (e.g., 810). In embodiments, the animated line graphics have an associated direction of motion, for example, left to right or right to left. In embodiments, the direction of motion is related to the flow direction of a commodity (e.g., as determined at block 515 of method 500, shown in FIG. 5).

In the illustrated embodiment, the animated line graphics are shown as moving from left to right in frames 1-5, for example, a represented by the motion of line segment 810. Frame 1 may correspond to a state of the animation (here, the animated line graphics) at a first time and frame 2 may correspond to a state of the animation at a second time after the first time. Additionally, frame 3 may correspond to a state of the animation at a third time after the second time and frame 4 may correspond to a state of the animation at a fourth time after the third time. Frame 5 may correspond to a state of the animation at a fifth time after the fourth time.

In embodiments, the sequence of frames (here, frames 1-5) may be repeated after the fifth frame. For example, as illustrated, a sixth frame may be substantially the same as the first frame, etc.

In some embodiments, the animated line graphics have an associated rate of motion (e.g., from left to right or from right to left), and the rate of motion may be related to a measured flow rate of the commodity, a measured pressure level of the commodity, or a measured energy level of the commodity, for example. The measured flow rate of the commodity, for example, may be determined based, at least in part, on the comparison of the current measurement value of the commodity to the reference measurement value of the commodity. As discussed in connection with figures above, the reference measurement value may correspond to a measurement value of the commodity at a first time. As also discussed in connection with figures above, the current measurement value may correspond to a measurement value of the commodity at a second time after the first time. A position of line segment 810, for example, may be adjusted from one frame to a next frame (e.g., frame 1 to frame 2) based on the rate of motion.

In some embodiments, a rough determination of relative flow rates can be computed without aid of any direct measurements of flow, e.g. from the diameter attribute of a pipe, or from the nominal operating voltage of a conductor as inferred from attributes of the nearest connected transformer (i.e. "primary" versus "secondary" voltage). The rate of motion of the animation can be very helpful in visually distinguishing these rudimentary but important attribute values. No special measuring equipment is needed to drive the animation rate in this case; it relies only upon static GIS data.

Another important statically derived datum that can drive the animation rate is a simple count of the number of downstream customers that are served through any given segment of electrical conductor or pipe. This datum can be computed (for any portion of the network that has radial topology) on the basis of static topology and attributes that have been captured in the GIS database, without the aid of any operational sensor data.

Similarly, another very useful proxy metric for rate of flow in a conductor in a radial electric network is the sum of transformer nameplate power ratings for the transformers that are downstream of the conductor. This is another potential driver for animation speed that is based on GIS data alone.

It is understood that the illustrated animated line graphics are not limited to moving from left to right, and from right to left, as shown. Rather, it is contemplated that the animation line graphics may move in any number of directions (e.g., up and down, etc., so as to follow the geographic path of the linear equipment, e.g. pipe or conductor, that carries the commodity).

It is also understood that the illustrated animated line graphics may have other characteristics or features that are responsive to commodity measurement data, or data inferred from GIS data. For example, dimensions of the line segments may be responsive to the commodity measurement data or the data derived from GIS data, e.g., the line segments may have first dimensions in response to first commodity measurement data (or first data inferred from GIS data) and second dimensions in response to second commodity measurement data (or second data inferred from GIS data). In one example, the first commodity measurement data (or first data inferred from GIS data) may be indicative of a first energy level of the commodity and the second commodity measurement data (or first data inferred from GIS data) may be indicative of a second energy level that is different from the first energy level. In another example, in an electrical network line thickness may be used to distinguish 3-phase portions of a distribution circuit from 1-phase portions of the distribution network.

It is further understood animations indicative of CVM data according to the disclosure are not limited to animated line graphics. Rather, in embodiments the animations may correspond to or include substantially any type of animation. For example, the animations may include an icon indicative of the commodity being distributed, and the animations may be user configured animations (e.g., as configured through an interface of a user device). As another example, instead of dashed lines or icons, wavy lines in motion could be used. This could be either a solid wavy line that moves (i.e., the peaks of the waves move) from left to right, for example, or it could be a dashed wavy line in which the dashes move along the curve (while the wave peaks stay in place), with a net motion to the left or the right, for example, as if the commodity were traveling through a serpentine pipeline toward its destination. This effect might in some cases be easier to interpret visually than a straight line of moving dashes or icons.

Referring to FIGS. 9A-9F, frames of an example animation (here, animated line graphics) indicative of CVM data are shown on example geographic map. As illustrated, the geographic map includes imagery representative of a distribution network, here an electrical distribution network. The electrical distribution network includes equipment (e.g., transformers) to facilitate distribution of electricity over a distribution area of the network.

Figure 9A:
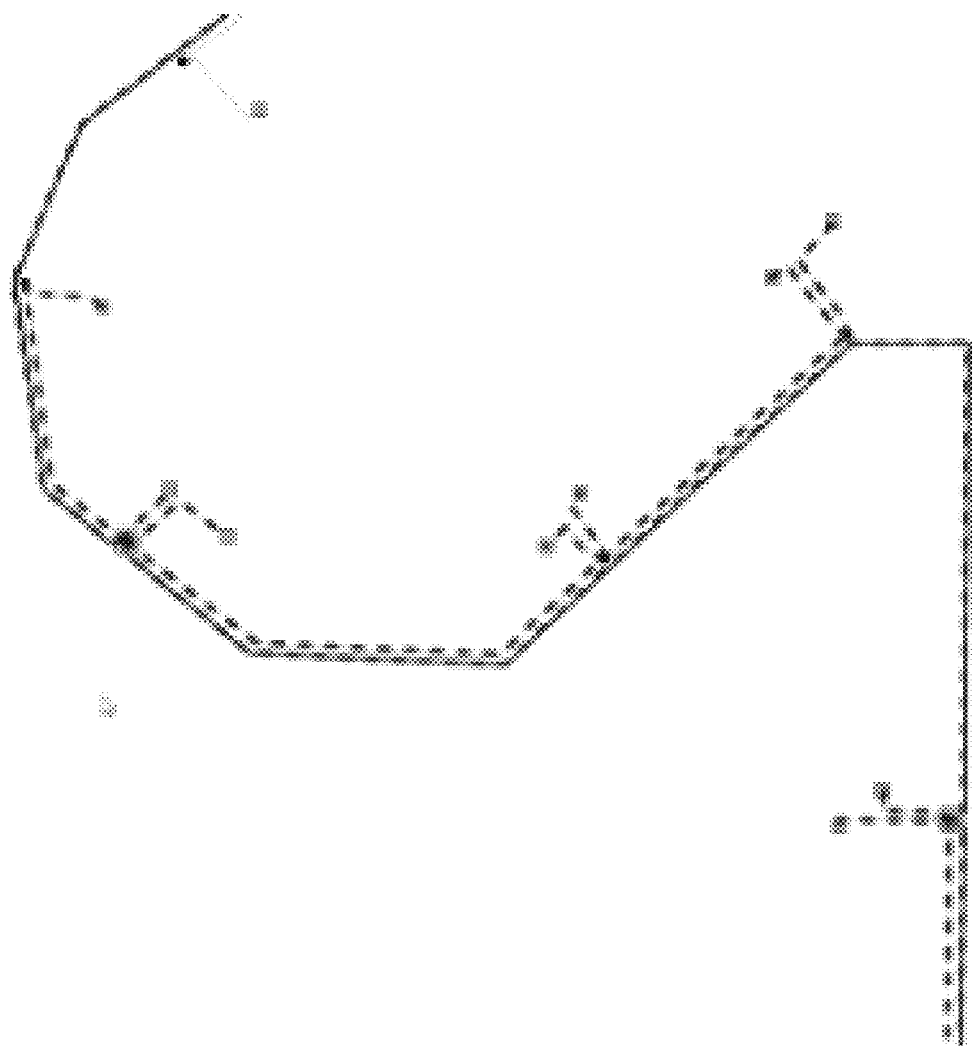
FIGS. 9A-9F show another example sequence of animation frames indicative of the CVM data on an example geographic map in accordance with embodiments of the disclosure.
Figure 9B:
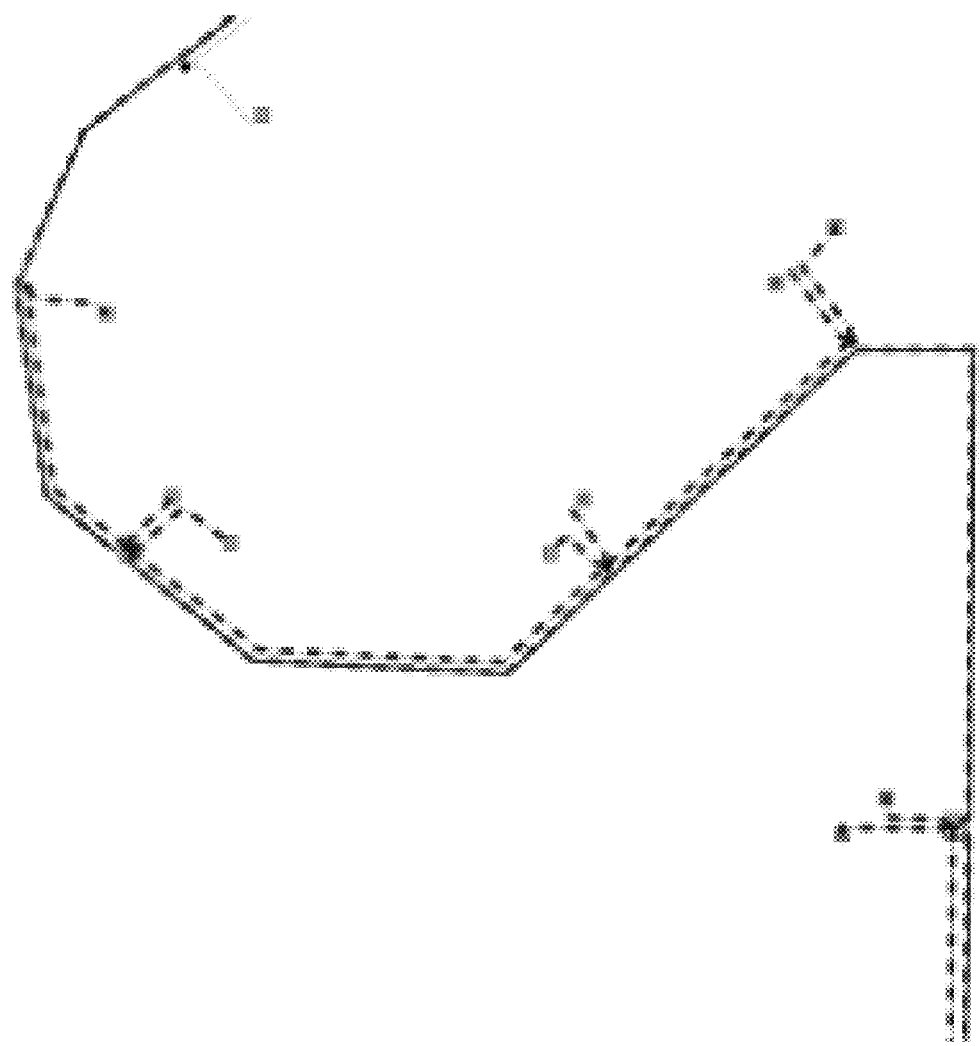
Figure 9C:
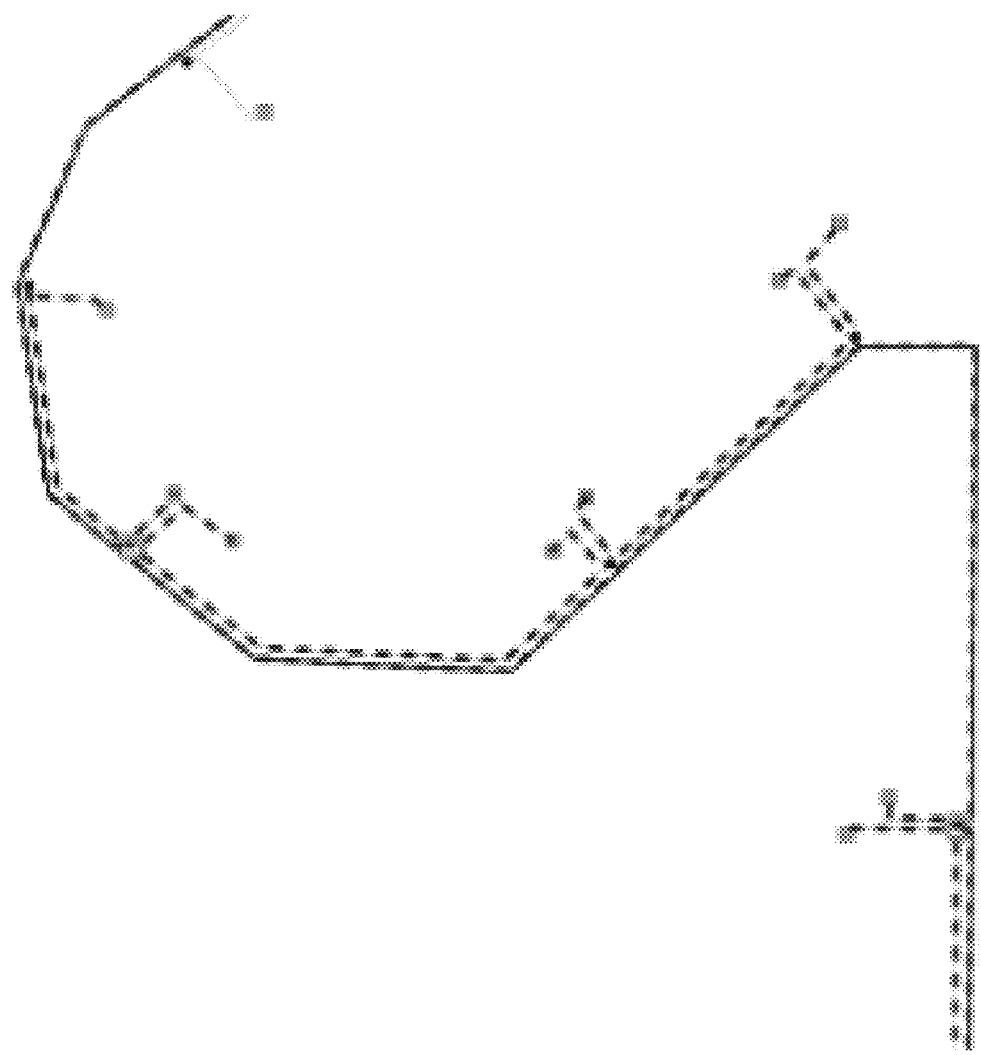

The frame shown in FIG. 9A illustrates the flow direction of the commodity over the distribution area (e.g., between equipment and facilities in the distribution area) at a first time. Additionally, the frame shown in FIG. 9B illustrates the flow direction of the commodity over the distribution area at a second time after the first time. Further, the frame shown in FIG. 9C illustrates the flow direction of the commodity over the distribution area at a third time after the second time.

Figure 9D:
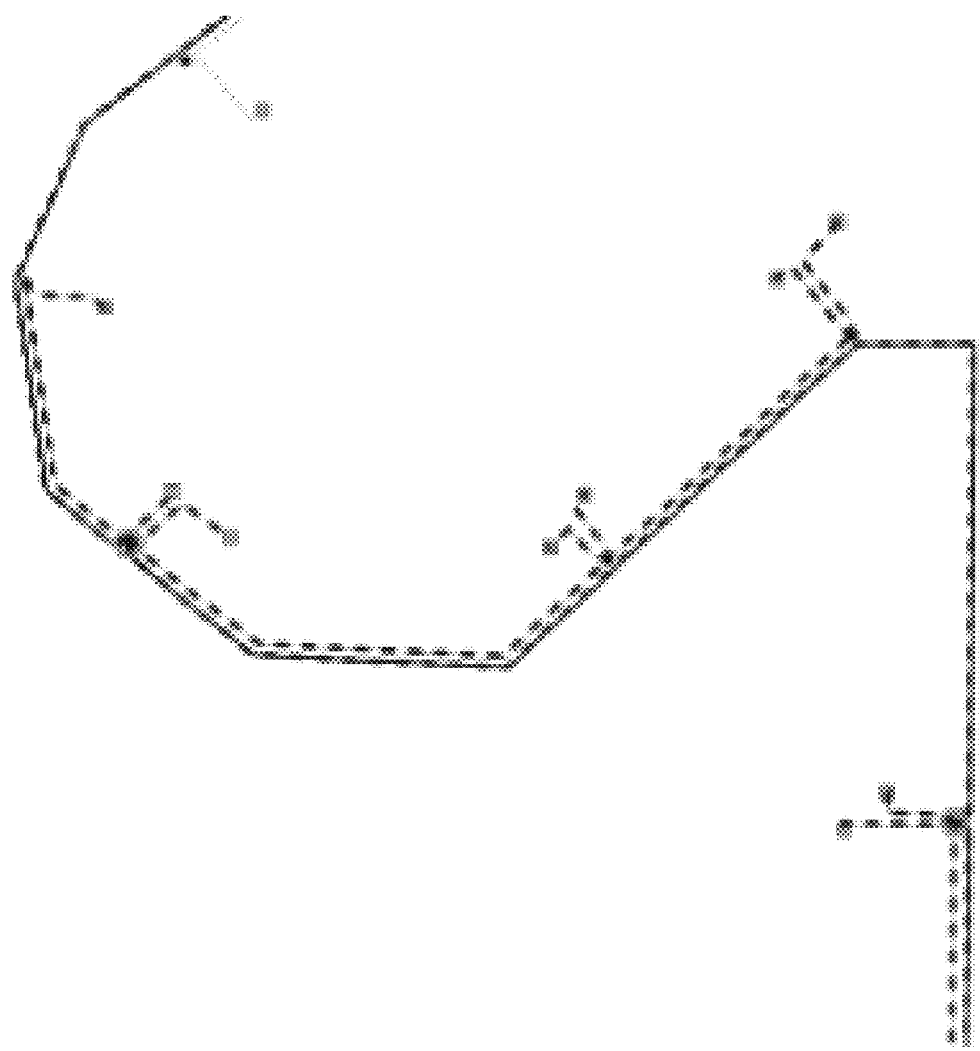
Figure 9E:
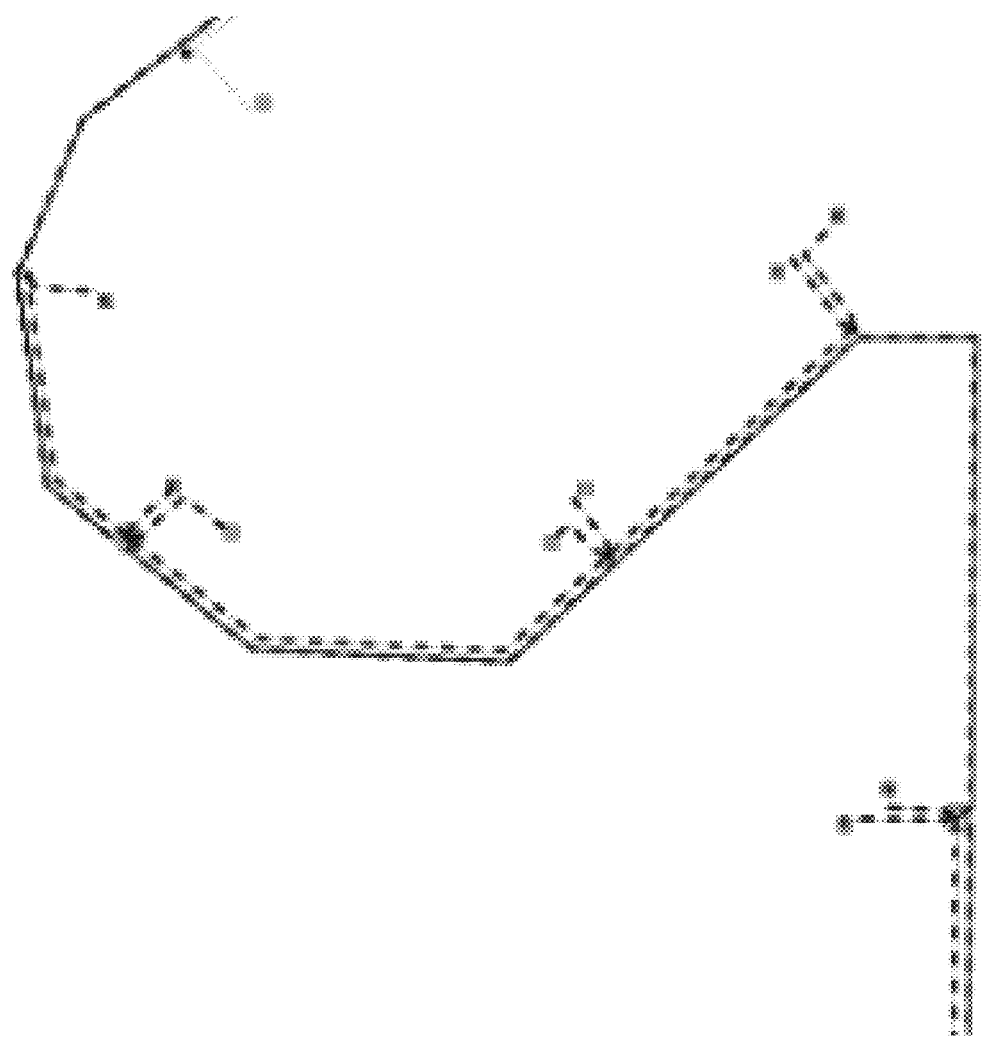
Figure 9F:
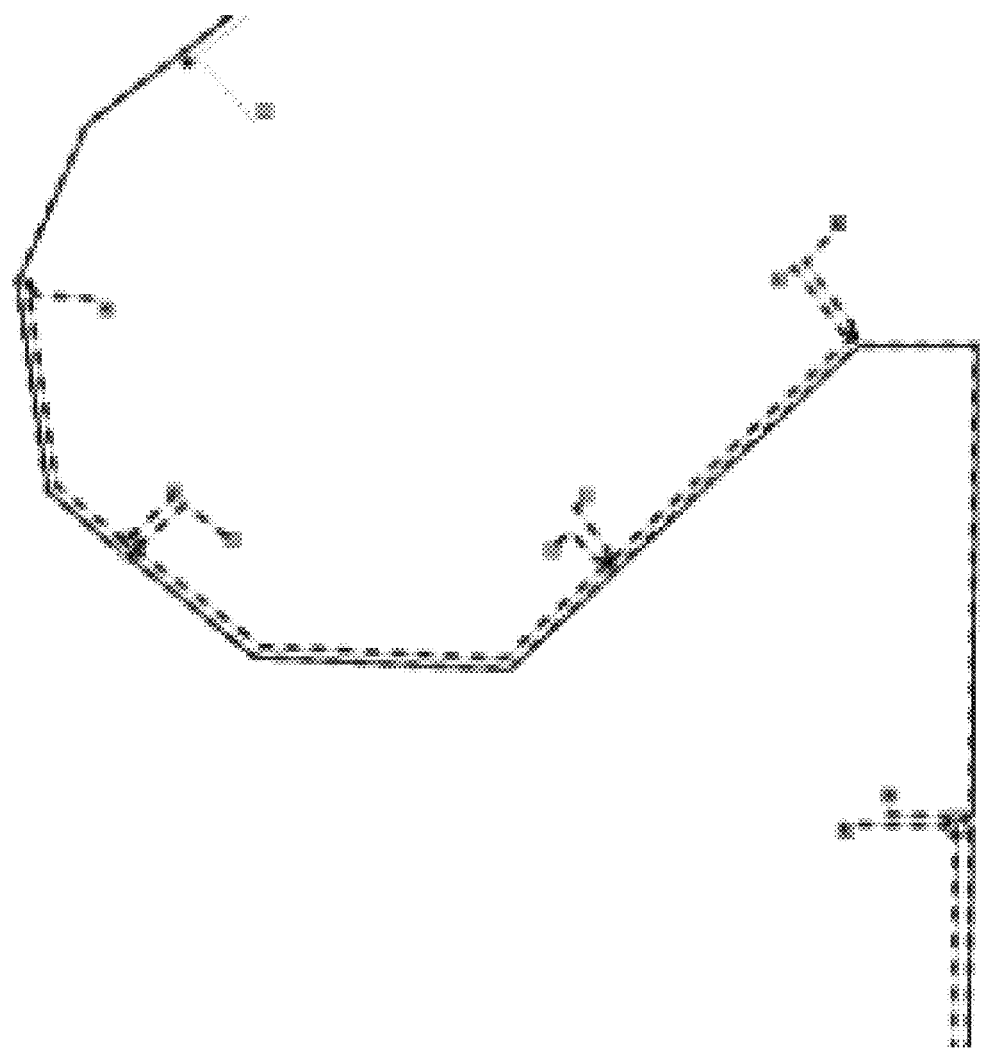

The frame shown in FIG. 9D illustrates the flow direction of the commodity over the distribution area at a fourth time after the third time. Additionally, the frame shown in FIG. 9E illustrates the flow direction of the commodity over the distribution area at a fifth time after the fourth time. Further, the frame shown in FIG. 9F illustrates the flow direction of the commodity over the distribution area at a sixth time after the fifth time.

In some embodiments, the flow direction of the commodity at the first time (illustrated in FIG. 9A) is determined based, at least in part, on a comparison of a current measurement value of the commodity at the first time to a reference measurement value of the commodity at a time prior to the first time. Additionally, in some embodiments the flow direction of the commodity at the first time is determined based on inferences from network topology of the distribution network and attributes of the equipment to facilitate distribution of the commodity, e.g., contained in GIS data.

In some embodiments, the flow direction of the commodity at the second time (illustrated in FIG. 9B) is determined based, at least in part, on a comparison of a current measurement value of the commodity at the second time to a reference measurement value of the commodity at a time prior to the second time. Additionally, in some embodiments the flow direction of the commodity at the second time is determined based on inferences from network topology of the distribution network and attributes of the equipment to facilitate distribution of the commodity, e.g., contained in GIS data.

In some embodiments, the flow direction of the commodity at the third time (illustrated in FIG. 9C) is determined based, at least in part, on a comparison of a current measurement value of the commodity at the third time to a reference measurement value of the commodity at a time prior to the third time, etc. Additionally, in some embodiments the flow direction of the commodity at the third time is determined based on inferences from network topology of the distribution network and attributes of the equipment to facilitate distribution of the commodity, e.g., contained in GIS data.

Without the benefit of a video capture to show what the animation effect shown in FIGS. 9A-9F looks/feels like on a display device, the shown animation effect is best illustrated by paging quickly through the sequence of figures (e.g., from FIG. 9A to FIG. 9B, from FIG. 9B to FIG. 9C, and so on).

As illustrated, it is much easier to see the flow direction of the commodity over the distribution area using the animation feature in accordance with embodiments of the disclosure than, for example, using conventional techniques in which flow direction is shown by stationary arrows. As noted above, flow direction information can be of life or death importance, for example, when developing emergency switching or valve operation orders to be executed in the field on a distribution network. As also noted above, flow direction information may be vital when designing distribution network facilities or analyzing their performance.

Referring to FIGS. 10A-10F, frames of another example animation (here, animated line graphics) indicative of CVM data are shown on another example geographic map. As illustrated, similar to FIGS. 9A-9F, the geographic map includes imagery representative of a distribution network, here an electrical distribution network. Similar to FIGS. 9A-9F, the electrical distribution network includes equipment (e.g., transformers, primary conductors, secondary conductors, etc., labeled in FIG. 10C) to facilitate distribution of electricity over a distribution area of the network, e.g., from energy suppliers to energy consuming customers.

Figure 10A:
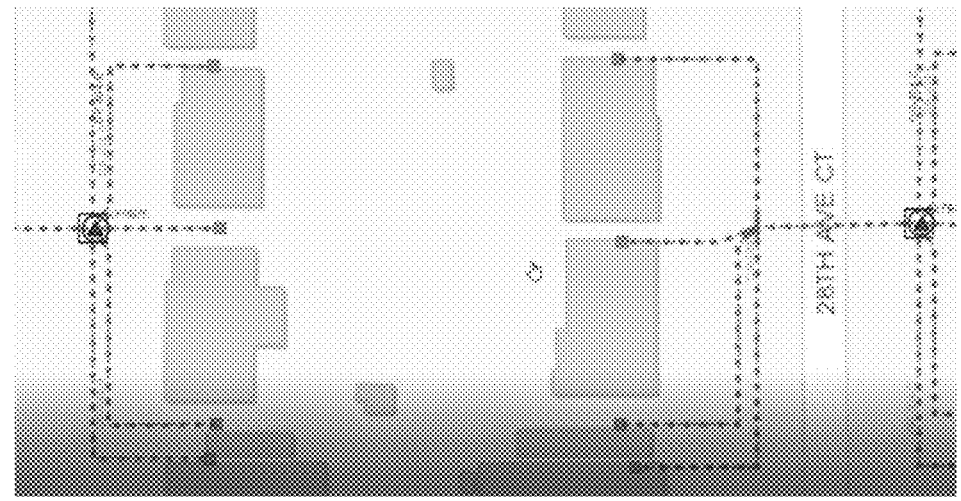
FIGS. 10A-10F show a further example sequence of animation frames indicative of the CVM data on an example geographic map in accordance with embodiments of the disclosure.
Figure 10B:
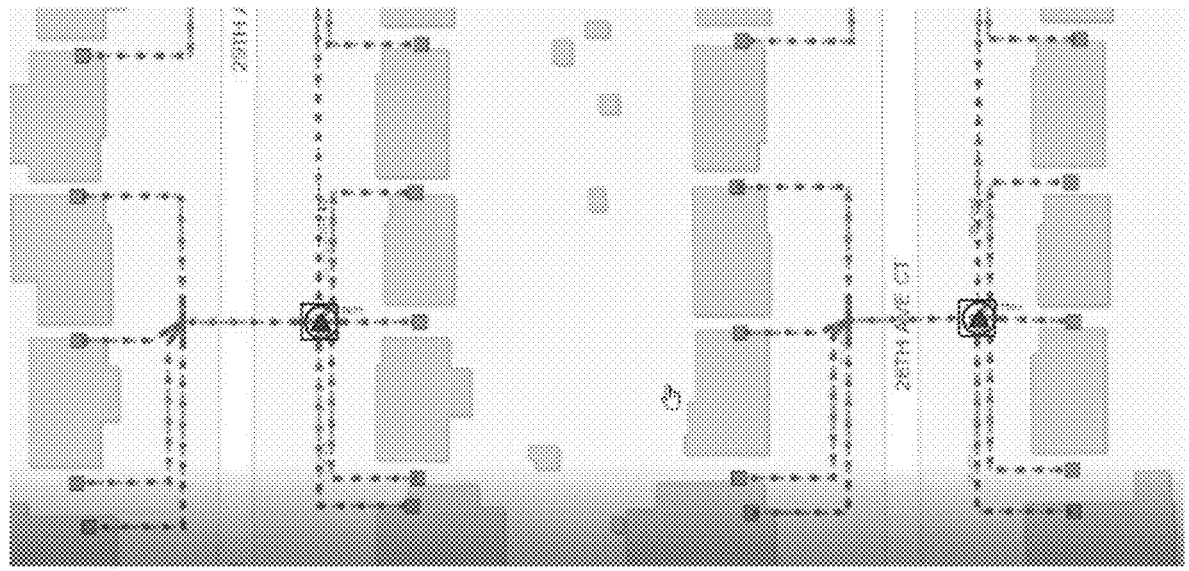
Figure 10C:
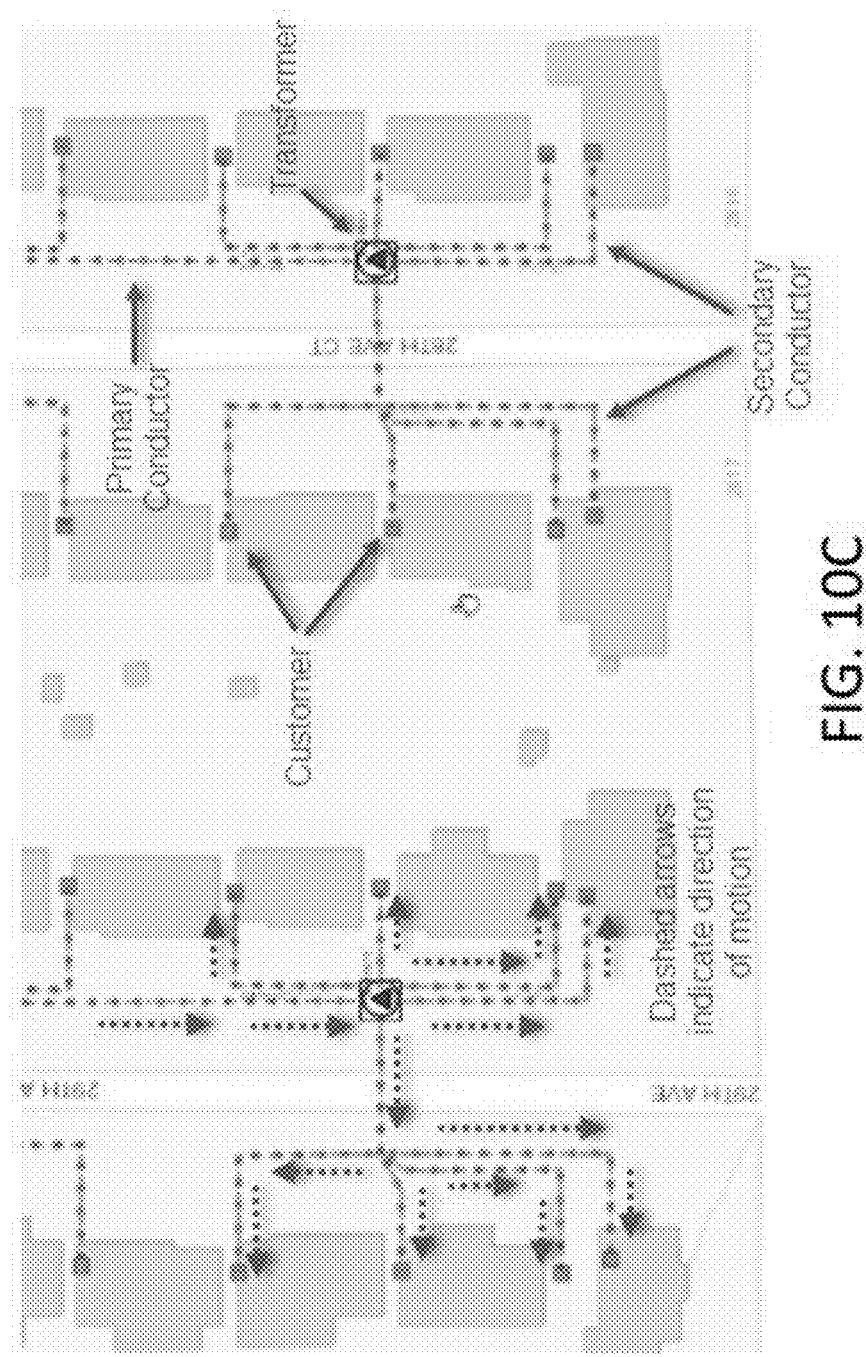

The frame shown in FIG. 10A illustrates the flow direction of the commodity over a first portion of the distribution area (e.g., between equipment and facilities in the distribution area) at a first time. Additionally, the frame shown in FIG. 10B illustrates the flow direction of the commodity over a second portion of the distribution area (here, at a second zoom level of the geographic map display) at a second time after the first time. Further, the frame shown in FIG. 10C illustrates the flow direction of the commodity over a third portion of the distribution area (here, at a third zoom level of the geographic map display) at a third time after the second time (with dashed arrows indicating flow direction in the example illustration).

Figure 10D:
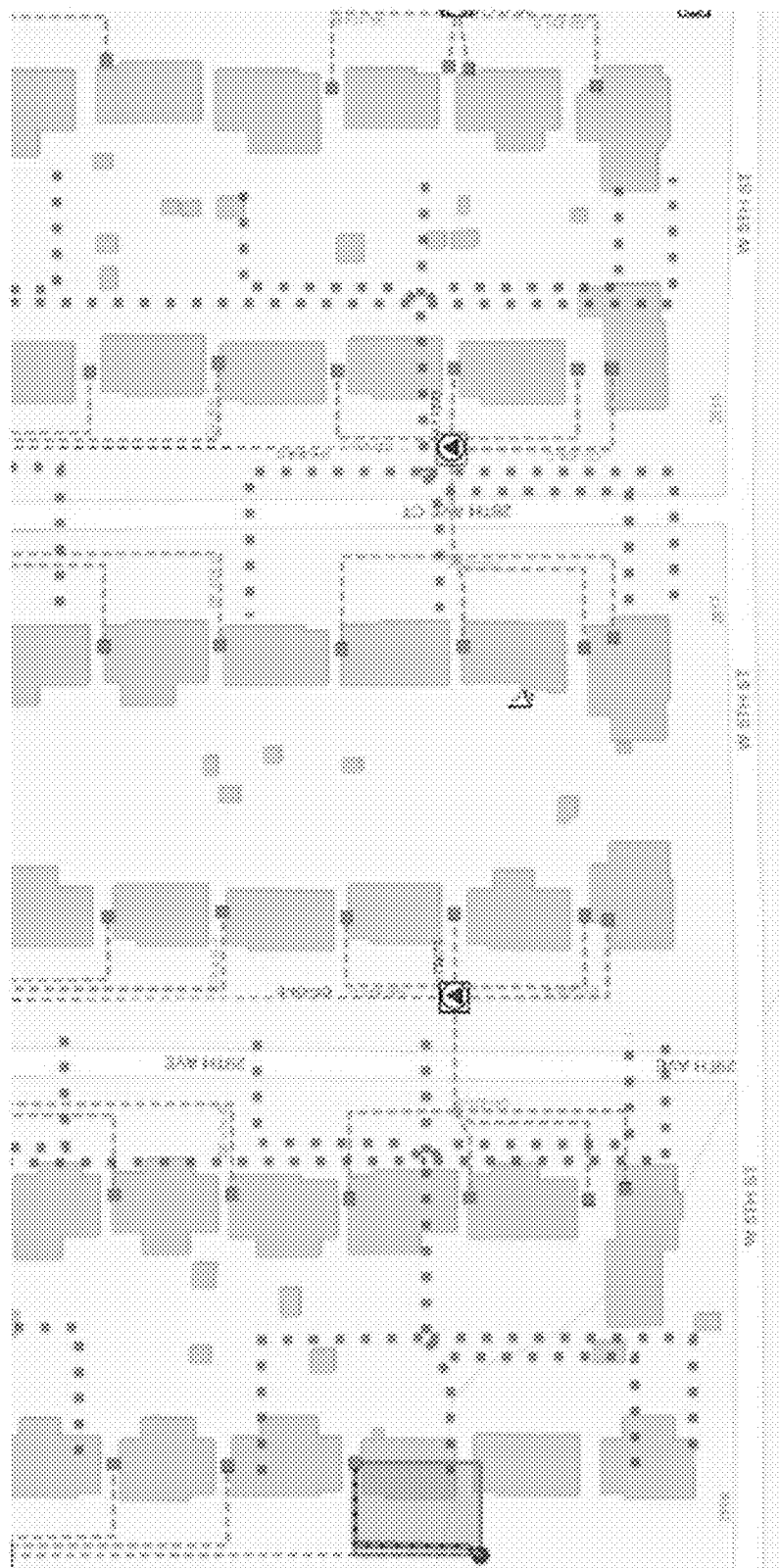
Figure 10E:
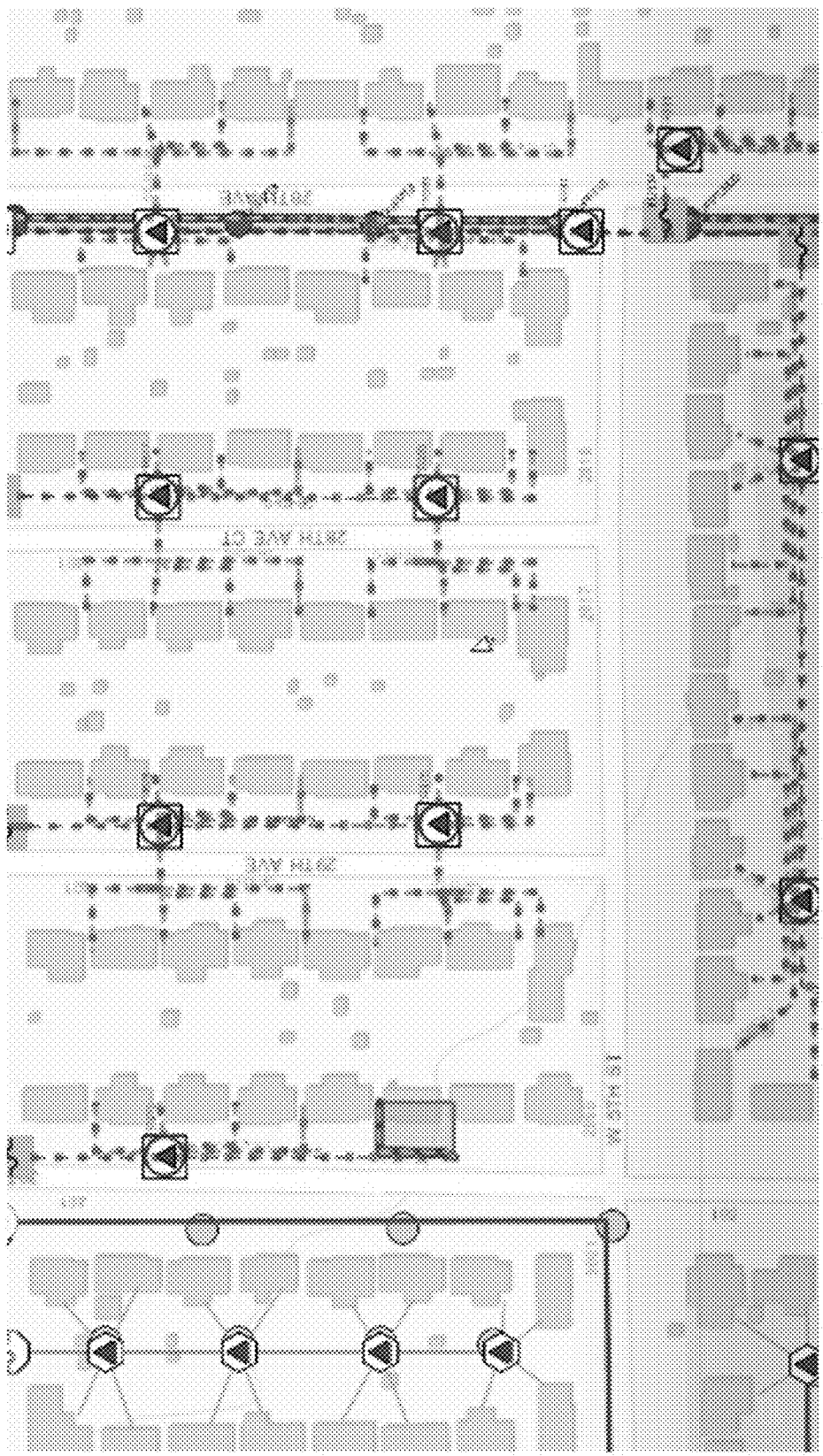
Figure 10F:
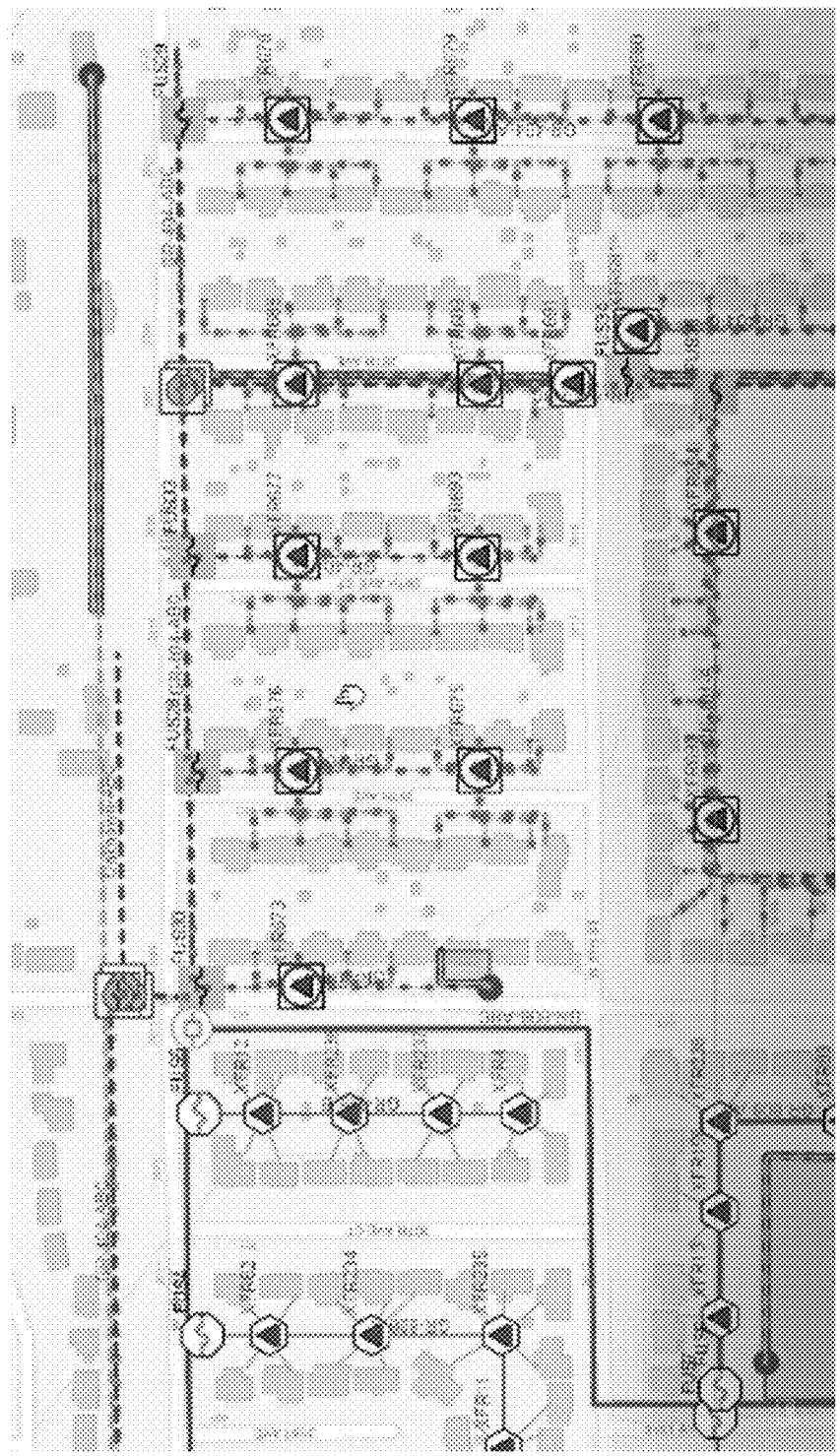

The frame shown in FIG. 10D illustrates the flow direction of the commodity over a fourth portion of the distribution area (here, at a fourth zoom level of the geographic map display) at a fourth time after the third time. Additionally, the frame shown in FIG. 10E illustrates the flow direction of the commodity over a fifth portion of the distribution area (here, at a fifth zoom level of the geographic map display) at a fifth time after the fourth time. Further, the frame shown in FIG. 10F illustrates the flow direction of the commodity over a sixth portion of the distribution area (here, at a sixth zoom level of the geographic map display) at a sixth time after the fifth time. As illustrated, several of the distribution area portions overlap with each other.

Similar to the commodity illustrated in FIG. 9A, for example, in some embodiments the flow direction of the commodity at the first time (here, illustrated in FIG. 10A) is determined based, at least in part, on a comparison of a current measurement value of the commodity at the first time to a reference measurement value of the commodity at a time prior to the first time. Additionally, in some embodiments the flow direction of the commodity at the first time is determined based on inferences from network topology of the distribution network and attributes of the equipment to facilitate distribution of the commodity, e.g., contained in GIS data.

Also similar to the commodity illustrated in FIG. 9A, in some embodiments the flow direction of the commodity at the second time (illustrated in FIG. 10B) is determined based, at least in part, on a comparison of a current measurement value of the commodity at the second time to a reference measurement value of the commodity at a time prior to the second time. Additionally, in some embodiments the flow direction of the commodity at the second time is determined based on inferences from network topology of the distribution network and attributes of the equipment to facilitate distribution of the commodity, e.g., contained in GIS data.

Further, similar to the commodity illustrated in FIG. 9A, in some embodiments the flow direction of the commodity at the third time (illustrated in FIG. 10C) is determined based, at least in part, on a comparison of a current measurement value of the commodity at the third time to a reference measurement value of the commodity at a time prior to the third time, etc. Additionally, in some embodiments the flow direction of the commodity at the third time is determined based on inferences from network topology of the distribution network and attributes of the equipment to facilitate distribution of the commodity, e.g., contained in GIS data.

In accordance with some aspects of this disclosure, the indication of flow direction can help a user to figure out, based on a glance at the map at any zoom scale, where to find the customers who would be affected by an interruption of the flow at a given point, by immediately answering the question, "which way is downstream from here?". The indication of flow direction can also help a user to deduce, intuitively from the visualization, the likely point of interruption that explains a given combination of customer locations known to have experienced an interruption in service, when those customer locations are symbolized in a map display. A computer program can also make that deduction, but many users are more comfortable with the computed results when they can easily verify them by a glance at a map on which the flow direction information is visually indicated. Crew dispatching destinations are typically chosen based on the likely point of interruption.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in applications (e.g., GIS applications) but rather, may be useful in substantially any application where it is desired to display information in a geographic map display.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method for visualizing flow direction in a distribution network, comprising:
   receiving, on a hardware device including a processor, Geographic Information System (GIS) data corresponding to the distribution network from a GIS database, the distribution network including equipment to facilitate distribution of a commodity over a distribution area, and the GIS data including information relating to distribution of the commodity;
   receiving, at the hardware device from a communication network, sensor data from one or more sensors in the distribution network, the sensor data including first sensor data and second sensor data;
   generating, on the hardware device, commodity vectorized measurement (CVM) data indicative of at least a direction of a flow of the commodity over the distribution area based, at least in part, on a comparison of a current measurement value of the commodity to a previous measurement value of the commodity, the comparison being based on the first sensor data;
   dynamically displaying, by the hardware device, the CVM data on a geographic map display of a client display device, the geographic map display including imagery representative of the distribution network contained in the GIS data, wherein the CVM data is represented by an animation on the geographic map display, the animation including the flow direction of the commodity and a flow rate of the commodity;
   controlling, over the communication network by the hardware device, one or more control devices coupled to the equipment to facilitate the distribution of the commodity over the distribution area to control the flow of the commodity over the distribution area indicated by the CVM data; and
   subsequent to controlling the one or more control devices to control the flow of the commodity over the distribution area indicated by the CVM data, dynamically displaying, by the hardware device, second CVM data on the geographic map display of the client display device based on the second sensor data.

2. The method of claim 1, wherein the sensors are configured to measure one or more parameters associated with distribution of the commodity and in response thereto generate the sensor data, and wherein generating commodity vectorized measurement data includes:
   determining the current measurement value of the commodity based on the sensor data; and
   generating commodity vectorized measurement data indicative of at least a flow direction of the commodity over the distribution area based, at least in part, on a comparison of the current measurement value of the commodity to the previous measurement value of the commodity contained in the GIS data.

3. The method of claim 1, wherein generating commodity vectorized measurement data includes:
   receiving, at the hardware device from a communications network, third sensor data from the one or more sensors in the distribution network at a first time, wherein the sensors are configured to measure one or more parameters associated with distribution of the commodity and in response thereto generate the third sensor data;
   determining a first measurement value of the commodity based on the third sensor data received at the first time;
   receiving, at the hardware device from the communications network, fourth sensor data from the one or more sensors at a second time after the first time,
   determining a second measurement value of the commodity based on the fourth sensor data received at the second time; and
   generating commodity vectorized measurement data indicative of at least a flow direction of the commodity over the distribution area based, at least in part, on a comparison of the second measurement value to the first measurement value, wherein the second measurement value corresponds to the current measurement value and the first measurement value corresponds to the previous measurement value, and wherein the first sensor data includes the third sensor data and the fourth sensor data.

4. The method of claim 3, wherein the parameters associated with distribution of the commodity include a state of the equipment used to distribute the commodity.

5. The method of claim 1, wherein dynamically displaying the commodity vectorized measurement data comprises:
   identifying portions of the distribution network that are of interest; and
   dynamically displaying the commodity vectorized measurement data on the geographic map display for the identified portions of interest.

6. The method of claim 1, wherein dynamically displaying the commodity vectorized measurement data comprises:
   dynamically displaying the commodity vectorized measurement data on the geographic map display for select portions of the distribution network to distinguish the select portions of the distribution network from other portions of the distribution network.

7. The method of claim 1, wherein the animation includes animated line graphics.

8. The method of claim 7, wherein the animated line graphics have an associated direction of motion, and the direction of motion is related to the flow direction of the commodity.

9. The method of claim 7, wherein the animated line graphics have an associated rate of motion, and the rate of motion is related to a measured flow rate of the commodity, a measured pressure level of the commodity, or a measured energy level of the commodity.

10. The method of claim 9, wherein the measured flow rate of the commodity is determined based, at least in part, on the comparison of the current measurement value of the commodity to the previous measurement value of the commodity.

11. The method of claim 1, wherein at least one characteristic associated with the animation is based on any one of: the flow direction of the commodity, a measured flow rate of the commodity, a measured pressure level of the commodity, or a measured energy level of the commodity.

12. The method of claim 1, wherein dynamically displaying the commodity vectorized measurement data comprises:

identifying a platform of the client device on which the geographic map is to be displayed;

generating the geographic map and the animation using a graphics library associated with the identified platform; and presenting the geographic map and the animation on a display of the client device.

13. The method of claim 1, further comprising:

analyzing performance of the distribution network based, at least in part, on the commodity vectorized measurement data; and providing an indication of the distribution network performance on the geographic map display.

14. The method of claim 1, wherein the distribution network includes any one of: an electrical distribution network, a gas distribution network, a water distribution network, or a telecom distribution network, and wherein the commodity includes any one of: electric power, gas, water, or telecom data, and wherein the equipment includes at least one of: a power line, a pipeline, and a cable.

15. A system for managing a distribution network, comprising:

a memory; and a processor coupled to the memory, the processor and the memory configured to:

receive, by the processor, Geographic Information System (GIS) data corresponding to the distribution network from a GIS database, the distribution network including equipment to facilitate distribution of a commodity over a distribution area, and the GIS data including information relating to distribution of the commodity;

receive, by the processor from a communication network, sensor data from one or more sensors in the distribution network, the sensor data including first sensor data and second sensor data;

generate, by the processor, commodity vectorized measurement data indicative of at least a direction of a flow of the commodity over the distribution area based, at least in part, on a comparison of a current measurement value of the commodity to a previous measurement value of the commodity, the comparison being based on the first sensor data;

dynamically display, by the processor, the commodity vectorized measurement data on a geographic map display of a client display device, the geographic map display including imagery representative of the distribution network contained in the GIS data, wherein the commodity vectorized data is represented by an animation on the geographic map display, the animation including the flow direction of the commodity and a flow rate of the commodity;

control, over the communication network by the processor, one or more control devices coupled to the equipment to facilitate the distribution of the commodity over the distribution area to control the flow of the commodity over the distribution area indicated by the CVM data; and dynamically display, by the processor subsequent to controlling the one or more control devices to control the flow of the commodity over the distribution area indicated by the CVM data, second CVM data on the geographic map display of the client display device based on the second sensor data.

16. The system of claim 15, wherein the processor and the memory are further configured to:

automatically control at least one component of the distribution network based on the commodity vectorized measurement data.

17. A method for visualizing flow direction in a distribution network, comprising:

receiving, over a communication network on a hardware device including a processor, Geographic Information System (GIS) data corresponding to the distribution network from a GIS database, the distribution network including equipment to facilitate distribution of a commodity over a distribution area, and the GIS data including information relating to distribution of the commodity;

receiving, on the hardware device over the communication network, sensor data from one or more sensors in the distribution network, the sensor data including first sensor data and second sensor data;

generating, on the hardware device, commodity vectorized measurement (CVM) data indicative of at least a direction of a flow of the commodity over the distribution area based, at least in part, on the GIS data and a comparison of the first sensor data and second sensor data;

dynamically displaying, by the hardware device, the CVM data on a geographic map display of a client display device, the geographic map display including imagery representative of the distribution network contained in the GIS data, wherein the CVM data is represented by an animation on the geographic map display, the animation including the flow direction of the commodity and a flow rate of the commodity;

controlling, over the communication network by the hardware device, one or more control devices coupled to the equipment to facilitate the distribution of the commodity over the distribution area to control at least one of the flow direction of the commodity or the flow rate of the commodity over the distribution area indicated by the CVM data; and subsequent to controlling the one or more control devices to control at least one of the flow direction of the commodity or the flow rate of the commodity over the distribution area indicated by the CVM data, dynamically displaying, by the hardware device, second CVM data on the geographic map display of the client display device.

18. The method of claim 17, wherein generating CVM data includes:

generating CVM data indicative of at least a flow direction of the commodity over the distribution area based, at least in part, on inferences from network topology of the distribution network and attributes of the equipment to facilitate distribution of the commodity, wherein the network topology and the equipment attributes are contained in the GIS data.

19. The method of claim 18, wherein the equipment includes one or more pipes, and the equipment attributes include a diameter of the pipe.

20. The method of claim 1, further comprising controlling by the hardware device at least one component of the distribution network based on the CVM data.

21. The method of claim 17, further comprising controlling by the hardware device at least one component of the distribution network based on the CVM data.

* * * * *